(12) United States Patent  (10) Patent No.: US 8,403,818 B1
Wilkinson et al.  (45) Date of Patent: Mar. 26, 2013

(54) EXERCISE RESISTANCE SYSTEM

(76) Inventors: William T. Wilkinson, Chester, PA (US); Robert Kennedy, Ottawa (CA); Paul McGrath, Flanders, NJ (US); Juan Fernandez, Towaco, NJ (US)

( * ) Notice: Subject to any disclaimer, the term of this patent is extended or adjusted under 35 U.S.C. 154(b) by 51 days.

(21) Appl. No.: 12/880,078

(22) Filed: Sep. 11, 2010

(51) Int. Cl.
*A63B 21/02* (2006.01)

(52) U.S. Cl. ........................................ 482/121; 482/908

(58) Field of Classification Search ............ 482/91, 482/121–130, 139, 904, 906, 908, 910
See application file for complete search history.

(56) References Cited

U.S. PATENT DOCUMENTS

| | | | | |
|---|---|---|---|---|
| 4,060,240 A | * | 11/1977 | Dunston | 482/131 |
| 4,257,592 A | * | 3/1981 | Jones | 482/131 |
| 4,787,630 A | * | 11/1988 | Watson et al. | 482/146 |
| 5,634,873 A | * | 6/1997 | Carlstrom | 482/95 |
| 6,245,001 B1 | | 6/2001 | Siaperas | 482/142 |
| 6,500,104 B1 | * | 12/2002 | Rich | 482/123 |
| 7,250,021 B2 | * | 7/2007 | Leight | 482/116 |
| 7,364,538 B2 | * | 4/2008 | Aucamp | 482/131 |
| 7,591,763 B1 | | 9/2009 | Fucci | 482/52 |
| 7,857,736 B2 | * | 12/2010 | Merrithew et al. | 482/121 |
| 8,021,286 B2 | * | 9/2011 | Suiter | 482/122 |
| 8,088,050 B2 | * | 1/2012 | Aucamp | 482/131 |
| 2008/0214369 A1 | * | 9/2008 | Mancini | 482/121 |
| 2010/0255966 A1 | * | 10/2010 | Aucamp | 482/131 |
| 2011/0251033 A1 | * | 10/2011 | Blancher | 482/123 |

* cited by examiner

*Primary Examiner* — Oren Ginsberg
(74) *Attorney, Agent, or Firm* — Andrew L. Salvatore, Esquire

(57) ABSTRACT

The present invention provides for an improved exercise resistance system to conduct numerous total body exercises. An adjustable elastic resistance cord or flat band may be combined with weights, or each type of resistance may be used alone, in order to vary the means of creating resistance during exercise. The length of the elastic resistance cord or flat band may be adjusted by means of a slip free, length quick adjustment device. The elastic resistance cord or flat band may be passed through the length quick adjustment device which may be secured at various points along the length of the elastic resistance cord or flat band, to change its effective usable length and thus change the level of strength, and range of motion. The length quick adjustment device may be secured by pulling an elastic resistance cord or flat band in one direction, and released by pulling the elastic resistance cord or flat band in the opposite direction.
One end of the elastic resistance cord or flat band is attached to any hand engagement structure, preferably a cord handle/grip, a dumbbell handle/grip, a bar, or a glove. The other end of the elastic resistance cord or flat band is secured to any anchor structure, preferably a movable structure, such as a flat board, pad, aerobic step, workout bench, or TV interactive exercise structure.

43 Claims, 20 Drawing Sheets

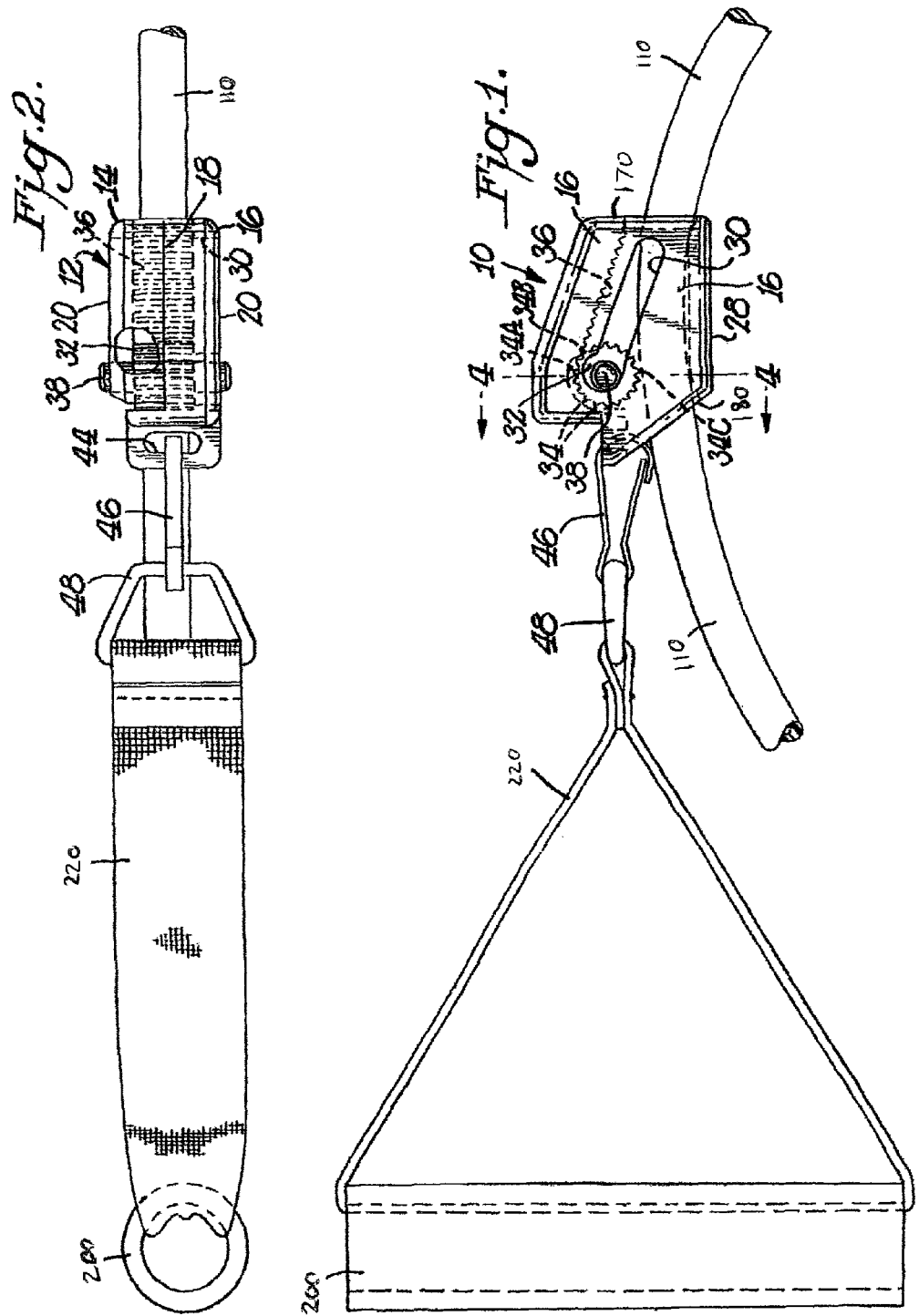

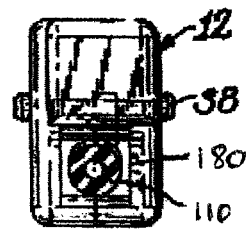
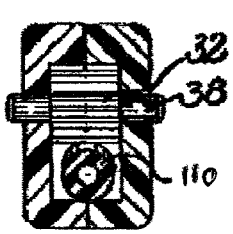
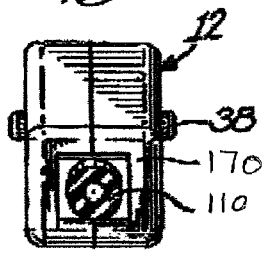
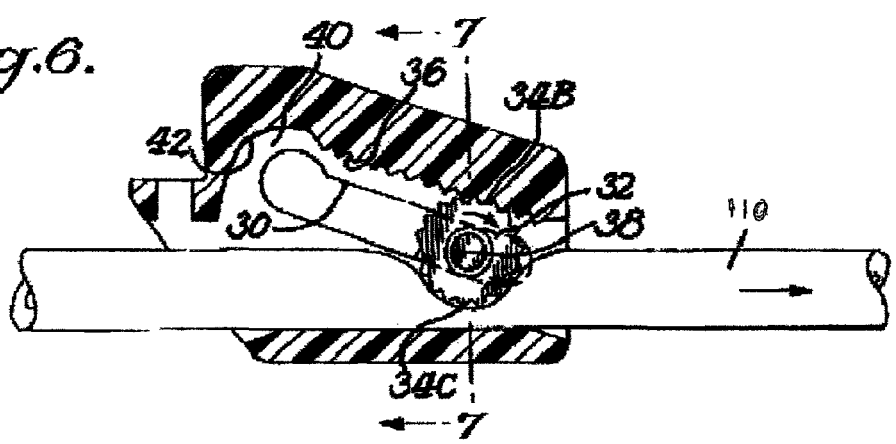
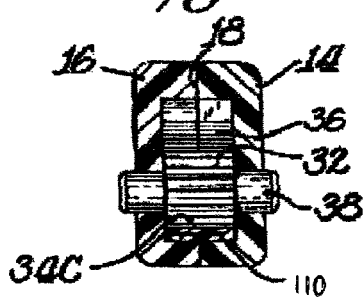

EXERCISE RESISTANCE SYSTEM

BACKGROUND OF THE INVENTION

Exercise equipment may provide resistance against muscle movement by a user through various means. The force of gravity provides resistance to users of free weights such as ankle weights, wrist weights, weight vests, dumbbells, and barbells. Free weights may be created by incorporating various forms of metal, water or sand. Some types of exercise equipment also utilize the force of gravity to provide resistance through the transfer of force through cables to weights positioned with the apparatus. Other types of resistance may be created through the use of hydraulic cylinders, springs, and flexible rods. Resistance may also be created with the use of a pressure screw in conjunction with a friction brake. A user's own body weight may provide the necessary resistance to conduct exercise.

Equipment may also utilize elastic resistance cords or flat bands, which stretch and elongate under pressure, to provide the necessary resistance to a user when conducting exercises. Elastic resistance cords or flat bands may be hand held or incorporated into a machine and may be closed loop or open elastic resistance cords or flat bands. Elastic resistance cords and flat bands provide an advantage through ease of use in that they are lightweight, compact, and inexpensive. Additionally, elastic resistance cords and flat bands provide increasing resistance as they stretch through a range of motion.

Another popular and common type of resistance exercise utilizes hand weights, such as dumbbells, barbells, weighted bars, and kettle bells. Another popular type utilizes tubular elastic resistance cords or flat bands. Each type of resistance (weights or elastic resistance cords or flat bands) provides a distinct and beneficial form of resistance exercise. However, each form has limitations. Free weights are generally more expensive, heavy, bulky, and non compact. Due to their heavy and bulky nature, weights alone are not very portable or easy to store. Further, adjusting the level of resistance by adding weights or changing to different weights is often time consuming and difficult. Additionally, adjusting a user's range of motion when utilizing weights is often difficult.

Elastic resistance cords or flat bands also have limitations. The predominant form of elastic resistance in the prior art is an elastic cord of a fixed length with handles attached at each end. Elastic resistance cords and flat bands are limited because they are generally of a uniform length and strength. Elastic resistance cords and flat bands of different strengths are generally manufactured to be distinguished by different colors or numbers. In order to change the resistance obtained while performing exercises, a user has traditionally been required to purchase an elastic resistance cord or flat band of a different strength or add more than one cord or flat band to a handle. This process is time consuming and expensive. Also, elastic resistance cords or flat bands usually come in a fixed length. Thus, elastic resistance cords or flat bands are limited, in that a user cannot easily adjust the strength of resistance or the range of motion.

The limitations in the current state of the art utilizing resistance bands are easily seen in products currently in the marketplace. A product currently being sold under the trademark Reebok™ utilizes a resistance cord, secured by handles at each end, to provide resistance. The resistance cord is attached to the handle by wrapping the resistance cord around posts on the handle. A user may then attempt exercise by pulling on the handle against the resistance of the resistance cord. However, the means of attaching the resistance cords to the handle and adjusting the resistance cords (a post) has clear limitations in that the resistance cords are not firmly secured to the handle, and the resistance cords easily become dislodged from the handle post. The inability to adequately secure the resistance cord to the handle not only reduces the effectiveness of the workout, but also creates a potential safety hazard if the cord should inadvertently dislodge from the handle in a workout.

Similarly, U.S. Pat. No. 5,894,631 describes a handle capable of engaging a resistance member, such as an elastic cord, by passing the resilient member through a tapered passage in the handle and securing the resilient member by engaging it with a spherical member also positioned within the tapered passage. However, the spherical member is loosely situated within the tapered passage and capable of complete removal from the tapered passage. Further, the tapered passage is conically shaped which permits the spherical member to easily dislodge from the tapered passage. Even with the spherical member in place in the tapered passage, the spherical member is easily dislodged thereby reducing its effectiveness in securing the resilient member. Additionally, resistance is derived only by pulling two handles in opposite directions, and does not contain a means to attach the resistance bands to another structure thus limiting the number and types of exercises that may be performed.

Further, an exercise system by Thera-Band® consists of a fitness ball platform to which resistance cords may be attached. However, the platform is large and bulky preventing a user from easily transporting the exercise system. Further, the platform contains a depressed surface to accommodate an exercise ball which requires the addition of additional elements to make a flat useable surface. The depressed surface does not create an evenly flat surface thus increasing the risk that the user will sustain an ankle injury when stepping onto the surface of the platform.

The present invention overcomes the limitations of the prior art by providing for a combination of various types of exercise resistance including but not limited to a combination of weights, gyroscopes, magnetic resistance, ropes, cables, wires, pneumatic resistance, hydraulic resistance, friction brake resistance, or the weight of a user's own body with elastic resistance cords or flat bands, springs, coils, or flex rods. In a preferred embodiment, the present invention provides for one or more adjustable elastic resistance cords or flat bands that allow the user to conduct exercise utilizing multiple types of resistance (weights and elastic resistance cords or flat bands) in one system. For instance, a user may conduct hand or leg resistance exercises utilizing elastic resistance cords or flat bands in combination with or separate from weights. The strength of the elastic resistance cord or flat band and the range of motion may be varied without the need to substitute or add another elastic resistance cord or flat band. The present invention permits a user to adjust the level of resistance quickly and easily over a greater range and allows for greater ease and speed of adjustment of resistance when conducting exercises. Further, the invention provides a means of securely attaching an elastic resistance cord or flat band for use in exercise thus increasing the number of types of exercise that a user may perform. Further, the invention provides for a flat, compact, and portable exercise surface on which the user may safely conduct many exercises.

As fewer resistance cords or flat bands or other items of equipment, are necessary to change resistance, the invention further provides a cost advantage over the prior art. The invention further provides a system that is easily portable, compact, and easy to store. The invention permits different types of exercises to be performed, e.g. aerobic exercises, strengthening exercises, and stretching exercises. Further, different kinds of accessories may be used with the invention. Exercises with the invention may be performed from different positions, e.g. standing, squatting, sitting, kneeling, and lying. The invention may be used to exercise the whole body, e.g. upper, mid, and lower body parts including the arms, back, abdominals, and legs, to provide a total body workout. The present invention is simple to use and is universally capable of use by anyone. Accordingly, the invention has overcome the limitations of the prior art by providing an easily adjustable resistance system which permits a rapid adjustment of length and strength without the need to change the components of the system. At the same time, it also creates a revolutionary new hybrid type of resistance exercise consisting of two or more types of resistance, preferably weight and elastic resistance, and achieves all of the above advantages in one simple, useful, affordable device for the public.

SUMMARY OF THE INVENTION

The present invention provides for a combination of various types of exercise resistance. In a preferred embodiment, the invention provides for elastic resistance cords or flat bands, which may be used in combination with any hand engagement structure, such as cord handles, dumbbell grip, bar, barbell grip, or glove, to conduct numerous exercises. The elastic resistance cords or flat bands may be combined with resistance types such as traditional free weights or may used alone to create resistance during exercise. As an elastic resistance cord or flat band is stretched and elongated under force, it provides increasing resistance. The level of resistance provided by the elastic resistance cord or flat band is determined by the composition and dimension of the elastic resistance cord or flat band and the distance that the elastic resistance cord or flat band is stretched or elongated relative to its length.

In the present invention, a hand engagement structure, such as handles, handgrips, dumbbells, barbells, bars, elastic resistance cord or band grips, gloves or mitts, hand or finger loops, hand or wrist cuffs or straps, and ankle or foot cuffs of straps, may be (1) used as an elastic resistance structure alone, (2) used as a weight structure alone, or (3) used as a hybrid combination of weight and elastic resistance. When elastic resistance cords or flat bands are used in combination with weights, resistance may be obtained through elastic resistance, weights, or a combination of these types of resistance. The resistance of the elastic resistance cords or flat bands may be adjustable or fixed and the resistance provided by weights may be adjustable or fixed. Accordingly, the resistance derived from these components may be in four forms. In a preferred embodiment, resistance is derived through a combination of (1) adjustable weight resistance and adjustable elastic resistance. In another form, resistance may be obtained through (2) a combination of adjustable elastic resistance and fixed weight resistance. In another form, resistance may be obtained through (3) a combination of fixed elastic resistance and adjustable weight resistance. Finally, resistance may be obtained through (4) a combination of fixed elastic and fixed weight resistance.

In the present invention, the strength of the adjustable elastic resistance cord or flat band may be changed by means of a slip free, length quick adjustment device. The elastic resistance cord or flat band may be passed through the length quick adjustment device which may be quickly secured at various points along the length of the elastic resistance cord or flat band to change its effective usable length. As force is applied to the elastic resistance cord or flat band in one direction, a locking mechanism within the length quick adjustment device secures the elastic resistance cord or flat band. The length quick adjustment device may be instantly released by pulling the elastic resistance cord or flat band in the opposite direction. The length quick adjustment device may be moved to various positions along the elastic resistance cord or flat band to change the effective usable length of the elastic resistance cord or flat band and thus vary the strength and range of motion of the elastic resistance cord or flat band. Free weights or other types of exercise equipment may be used in conjunction with the elastic resistance bands. Elastic resistance cords may also be used in exercise, and the usable length may be adjusted in a similar manner. Various exercises may be easily be performed utilizing adjustable elastic resistance cords or flat bands in this manner, alone or in conjunction with other types of exercise equipment.

Thus, the invention provides for a revolutionary new type of resistance exercise that draws on attributes of one or more types of resistance. When used in combination with the length quick adjustment device, the resistance provided by the elastic resistance cord or flat band is quickly and easily adjustable, and firmly secured. The invention also creates a new method of exercise whereby unique programs can be developed utilizing elastic resistance cords or flat bands referring to numbers, color zones, or other types of markings on the elastic resistance cords or flat bands to assist in adjusting the level of resistance quickly and easily, for different movements/exercises in an exercise workout program.

BRIEF DESCRIPTION OF THE DRAWINGS

FIG. 1 shows a side elevational view of a length quick adjustment device according to the invention.

FIG. 2 shows a top plan view of a length quick adjustment device according to the invention.

FIG. 3 shows a front side elevational view of a length quick adjustment device according to the invention.

FIG. 4. shows a cross section front elevational view taken through FIG. 1 along line 4 according to the invention.

FIG. 5 shows a rear side elevational view of a length quick adjustment device according to the invention.

FIG. 6 shows a cross section side elevational view of a length quick adjustment device according to the invention.

FIG. 7 shows a cross section front elevational view taken through FIG. 6 along line 7 according to the invention.

DETAILED DESCRIPTION OF THE INVENTION

Figure 8:
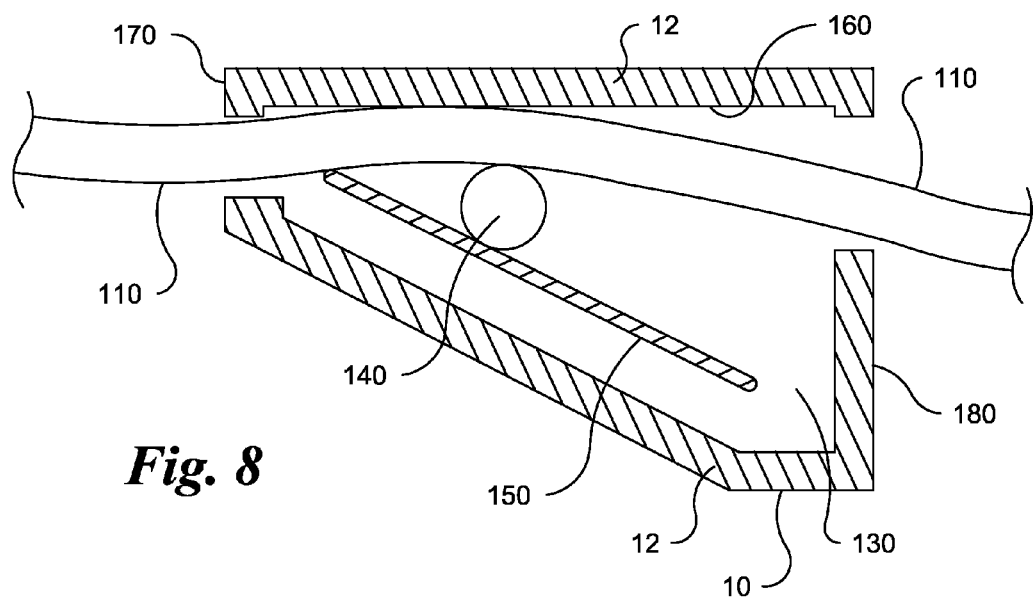
FIG. 8. shows a cross section side elevational view of a length quick adjustment device with a ball according to the invention.

Combination of More than One Resistance Type

The present invention is a combination of one or more types of resistance. The invention combines aspects of one or more varied types of exercise including but not limited to a combination of weights, elastic resistance cords or flat bands, springs, coils, flex rods, gyroscopes, magnetic resistance, pneumatic resistance, hydraulic resistance, friction brake resistance, and the weight of a user's own body. The invention is any device that uses one or more types of resistance, but preferably combines two types of resistance. The level of resistance provided by each type of exercise may be fixed or adjustable.

In a preferred embodiment of the invention, elastic resistance cords, flat bands or springs are used in combination with weights such as dumbbells, bars, or barbells. In this embodiment, resistance may be obtained through elastic or spring resistance, weights, or a combination of these types of resistance to form a new "hybrid" form of resistance. By way of example, the invention can include use of a cable attached to a coil spring and friction brake assembly such that as a user pulls on the cable, he obtains resistance from the spring and the friction brake. As used herein, elastic resistance refers to both elastic and spring resistance. The resistance of the elastic resistance cords or flat bands may be adjustable or fixed and the resistance provided by weights may be adjustable or fixed.

Resistance Combinations

Accordingly, the resistance derived from these types of resistance may be in four forms: in a preferred embodiment, resistance is derived through (1) a combination of adjustable elastic resistance and adjustable weight resistance. (2) In another form, resistance may be obtained through a combination of adjustable elastic resistance and fixed weight resistance. (3) In another form, resistance may be obtained through a combination of fixed elastic resistance and adjustable weight resistance. (4) Finally, resistance may be obtained through a combination of fixed elastic and fixed weight resistance.

Hand Engagement Structures

Also in a preferred embodiment of the invention, elastic resistance may be combined with any hand engagement structure. The hand engagement structure includes any structure which may be held by hand and includes but is not limited to a handle or grip, a hand held weight, such as a dumbbell, barbell, bar, a glove, a mitt, one or more loops capable of fitting around the hands or fingers of a user, or wrist cuffs. The hand engagement structures can also be used to engage the foot or ankle or other body parts.

Preferred Combinations of Resistance Types

In a preferred embodiment, the present invention provides for a combination of any hand engagement structure, such as but not limited to a glove, finger or hand loops, dumbbell, bar, barbell, or handle or grip with an elastic resistance cord or flat band 110. Further, a weight (for instance a weight plate) utilizing the force of gravity, may be attached to a handle or grip for elastic resistance cords or flat bands to provide additional resistance.

The most preferred forms of the invention are (1) one or more elastic resistance cords or flat bands 110 in combination with one or more handles 200, (2) one or more elastic resistance cords or flat bands in combination with weights such as a dumbbell, and (3) one or more elastic resistance cords or flat bands 110 in combination with weighted gloves such that resistance is obtained during exercise from the elastic resistance cord or flat band 110 in combination with a weight. In a preferred embodiment, the invention may utilize lighter hand weights such as a weighted handle 200 or a dumbbell in combination with elastic resistance. However, a heavier weight, such as is typically used with a barbell, may also be used in conjunction with elastic resistance cords or flat bands. Additionally, a user may perform exercises utilizing adjustable elastic resistance cords or flat bands alone, or a weighted handle 200 or dumbbell alone as described herein. Moreover, the invention permits a user to move more quickly and easily from a form which derives resistance solely from weight to a form which derives resistance solely from elastic resistance. Further the invention permits a combination of both forms of resistance as preferred by the user.

The combination of a handle 200 with an elastic resistance cord or flat band 110 may contain the following unique components: (1) a means of attaching weight to the handle, (2) an elastic resistance cord or flat band 110; (3) a means for adjusting the usable length of the elastic resistance cord or flat band 110 such as a length quick adjustment device 10 capable of attachment to the elastic resistance cord or flat band 110 at any point along its length; (4) a means for attaching the handle 200 to the length quick adjustment device 10 which includes a strap 220 connected to the handle 200 and a finger clip 46 (or two sided finger clip 47) connected to the strap 10 and the length quick adjustment device 10; (5) a finger clip 46 (or two sided finger clip 47) attached to one end of the elastic resistance cord or flat band 110 for attachment of the elastic resistance cord or flat band 110 to an anchoring structure; and (6) an anchoring structure of any type but preferably a moveable board, pad 350, or aerobic step. These components allow a user to vary range of motion, amount of resistance, and method of exercise with ease and allow a user to conduct a total body workout virtually anywhere involving all types of exercise such as aerobic, stretching and strengthening. As indicated, weights, gloves or weighted gloves may also be combined with elastic resistance cords or flat bands 110 to create a "hybrid" resistance which ranges from weight resistance only to elastic resistance only and permits a combination of elastic and weight resistance.

2. Elastic Resistance and Means of Adjusting Resistance

An elastic resistance band is generally of flat construction while an elastic resistance cord is generally of a tubular rounded construction. Either elastic resistance cords or flat bands may be utilized in the invention, and as used herein, a reference to one includes a reference to the other. Elastic resistance may be adjusted by a number of means: (1) addition or subtraction of elastic cords, (2) substitution of cords of different strengths or lengths, and (3) adjusting the usable length of an elastic cord. The elastic resistance cord or flat band 110 may also be connected to other equipment which provides additional resistance through the force of gravity. In this way, the elastic resistance cord or flat band 110 may combine aspects of elastic based resistance and gravity based resistance against actions of the user.

Figure 9:
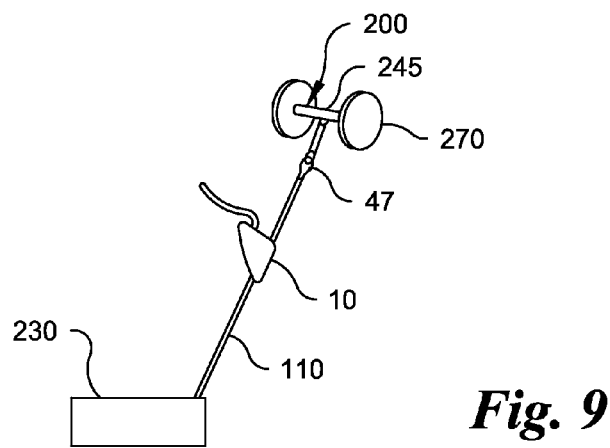
FIG. 9 shows a perspective view of an embodiment of an exercise device utilizing a handle and an adjustable elastic resistance cord secured at one end according to the invention.

For instance, as shown in FIG. 9, the elastic resistance cord or flat band 110, or a plurality of elastic resistance cords or flat bands, may be connected at one end to a handle 200 by connecting the elastic resistance cord or flat band 110 to at least one hasp 243 positioned on a handgrip 245 of the handle 200. The handgrip 245 may be a sleeve which is capable of rotating around the handle 200 so that the handgrip 245 remains stationary with respect to a user's hands notwithstanding movement of the handle 200 during exercise. In a preferred form, the handgrip 245 may be padded to better enable the user to grasp the handle 200. The hasp 243 may be oriented perpendicular to the direction of the handgrip 245 so as to permit the fingers of a user to easily pass around the hasp 243 when grasping the handgrip 245 during exercise. The elastic resistance cord or flat band 110 may be permanently attached to the handle 200 or may be detachable. In a preferred embodiment, the elastic resistance cord or flat band 110 may be connected to a finger clip 46 (or two sided finger clip 47) which is attached to the handle 200 such that the finger clip 46 may be opened to release the elastic resistance cord or flat band 110 from the handle 200. Additionally, elastic resistance cords or flat bands may be connected to each other sequentially by one or more finger clips or other means of attachment to extend the overall usable length of the cords or flat bands.

Elastic resistance may be fixed or adjustable. Various means may be used to adjust the strength of an elastic resistance cord or flat band 110. For instance, the user may increase or decrease the number of elastic cords being used in a workout. The invention also allows for the complete removal of a resistance cord and substitution of another cord of a different resistance to adjust the strength. Alternately, the strength of an elastic resistance cord or flat band 110 may be varied by changing the usable length of the elastic resistance cord or flat band. Under static conditions, when an elastic resistance cord or flat band 110 is not elongated and relaxed, the elastic resistance cord or flat band is not under tension and provides little resistance against the action of a user. As the elastic resistance cord or flat band 110 is stretched and elongated under force, its potential energy builds and it provides increasing resistance. The level of resistance provided by the elastic resistance cord or flat band 110 may be determined by the distance that the elastic resistance cord or flat band is stretched or elongated in relation to its static length.

The invention describes a means of adjusting the resistance provided by the elastic resistance cord or flat band for a given range of motion during exercise, by adjusting its length. As the resistance is increased, the user's ability to counter the increased resistance and complete the full range of motion will be decreased. Accordingly, with increasing resistance, the user's effective range of motion will be decreased. In a similar manner, as the level of resistance is decreased, the user will be better able to provide force against the resistance and his effective range of motion will be increased.

Elastic resistance cords or flat bands of the prior art provide limited means of adjusting the level of resistance provided by individual resistance cords or flat bands. A user's maximum range of motion for a particular exercise is fixed based upon his own strength and bodily dimensions. Accordingly, using the inventions of the prior art, if a user wished to adjust the level of resistance when conducting exercises using elastic resistance cords or flat bands, the user would need to utilize multiple cords or flat bands, at various stages of exercise, each providing varying levels of resistance. For instance, when conducting curls, a user would need to utilize an elastic resistance cord or flat band, providing a certain level of resistance, and to increase the level of resistance, the user would need to add cords or utilize a different elastic resistance cord or flat band to change the level of resistance. The present invention overcomes these limitations by providing an elastic resistance cord or flat band 110 capable of substitution and length adjustment thereby providing varying levels of resistance utilizing the same elastic resistance cord or flat band 110.

3. Length Adjustment Means

In the present invention, the length of the elastic resistance cord or flat band 110, and thus the level of resistance that the elastic resistance cord or flat band 110 can provide, may be adjusted by any means but preferably by means of a slip free, length quick adjustment device 10. As shown in FIG. 1, the length quick adjustment device 10 includes a housing 12 formed by mirror image housing halves 14 and 16 joined together at connecting line 18. Housing 12 includes a pair of side walls 20, a rearward end 180 and a forward end 170. Housing 12 may be hollow except for the locking components described herein. An elastic resistance cord or flat band 110 may pass through the housing between the side walls 20 from the forward end to the rearward end along the base 28 of the housing thereby defining a passageway for the elastic resistance cord or flat band 110. Further, the invention allows for the complete release of an elastic resistance cord, so that another cord of a different resistance or length can be substituted, using the same set of handles.

Each wall 20 includes a slot 30 inclined with respect to the passageway for the elastic resistance cord or flat band 110. Each slot 30 may extend from the upper portion of its side wall 20 at the rearward end 180 and may extend to about the center of its side wall near the forward end 170. Within the housing 12 is a locking pinion 32 having peripheral teeth 34 uniformly spaced along its outer surface for engagement with rack 36 within the housing parallel to the slots 30. Pinion 32 may be in the form of a roller having an axial shaft or pin 38 which may extend through the slots and about which pinion 32 rotates.

As shown in FIG. 6, the length quick adjustment device path defined by the path of movement of the pinion 32 may include a start position 40 juxtaposed to the beginning of rack 36. Start position 40 includes an enlarged smooth surface 42 which permits the pinion to be located wherein the teeth 34A located furthest from or diametrically opposite the elastic resistance cord or flat band 110 are out of contact with the rack while other teeth 34B closer to the elastic resistance cord or flat band 110 begin to make contact with the rack 36. Teeth 34C diametrically opposite teeth 34A are disposed in the passageway for the elastic resistance cord or flat band and thus contact elastic resistance cord or flat band 110.

When it is desired to permit the elastic resistance cord or flat band 110 to pass through the housing 12 and thus permit some length or position adjustment of the elastic resistance cord or flat band 110, the pinion 32 may be held in the start position by the user pressing against the shaft 38 which extends outwardly of the side walls 20 in a direction toward the rearward end 180 thereby minimizing contact between the teeth 34 and the elastic resistance cord or flat band 110 thus permitting the elastic resistance cord or flat band 110 to move generally freely through the housing. In such manner, the length quick adjustment device 10 may be moved to any position along the elastic resistance cord or flat band 110, or may be removed from the elastic resistance cord or flat band, without the teeth 34 engaging the elastic resistance cord or flat band. If desired, there may be sufficient space in the enlarged smooth surface 42 area to move pinion 32 sufficiently toward the rearward end 180 so that none of the teeth is engaged with rack 36. Accordingly, different elastic resistance cords or flat bands may be removed from the exercise device and substituted for each other.

When a sufficient amount of the elastic resistance cord or flat band 110 has passed through housing 12, pinion 32 may be released such that pinion 32 may travel toward the forward end 170 of the length quick adjustment device 10. The contact of the elastic resistance cord or flat band 110 with the teeth 34 causes the pinion to rotate and the engagement of the teeth 34 with the rack 36 moves the pinion toward the forward end 170 of the housing 12 with the teeth 34 progressively digging deeper into the elastic resistance cord or flat band 110 until the elastic resistance cord or flat band 110 can no longer move. FIG. 6 shows the condition in which the elastic resistance cord or flat band 110 is locked into position by the pinion 32.

The length quick adjustment device permits multiple cords or bands to pass through it, although a single cord or band is preferred. It is to be understood that the length quick adjustment device 10 may also accommodate the passage of additional elements through the length quick adjustment device 10 such as ropes, lines, cables, cords, strings, or hollow members such as elastic tubes and other forms of tubing. The length quick adjustment device 10 may also accommodate a flat elongated material 120 or other shaped elongated materials which are capable of passing through the length quick adjustment device 10, and the invention is not limited to use of an elastic resistance cord or flat band 110 in conjunction with the length quick adjustment device 10. The length quick adjustment device 10 may also accommodate more than one elastic resistance cord or flat band or other elongated material.

Figure 27:
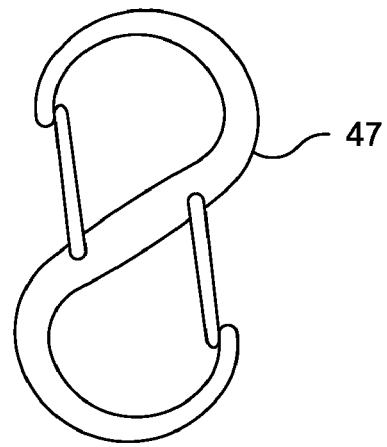
FIG. 27 shows a top elevational view of a two sided finger clip according to the invention.

As shown in FIG. 1 and FIG. 2, the housing 12 may include a slot 44 into which a finger clip 46 of any suitable known construction may be attached. As used herein and as shown in FIG. 27, a two sided finger clip 47, capable of clipping onto an object from either side, may used interchangeably with finger clip 46. Finger clip 46 in turn may be engaged with D-ring 48 which may be secured to a strap 220 connected to handle 200.

It is to be understood that the illustrations in FIG. 1 and FIG. 2 of components that may be used with the length quick adjustment device 10 are merely stated for exemplary purposes and is not intended to limit the scope of the invention. Accordingly, the length quick adjustment device 10 may be used wherever it is desired to permit adjustment in the length or location of an elongated material and then readily lock the material in place to prevent further movement of the material.

In an alternate embodiment, as shown in FIG. 8, the length quick adjustment device 10 may have a housing 12 which defines an interior chamber 130 containing a top surface 160. The chamber 130 also may contain a ball 140 or a similar object which is capable of rolling along an inclined surface 150 within the length quick adjustment device 10. The distance between the ball 140 and the top surface 160 of the chamber varies depending on the position of the ball 140 along the inclined surface 150. The incline is greatest at the forward end 170 of the length quick adjustment device 10 and least at the rearward end 180 of the length quick adjustment device.

One or more elastic resistance cords or flat bands 110 may be inserted through the length quick adjustment device 10 to a desired position passing between the ball 140 and the top surface 160 of the chamber. The length quick adjustment device 10 as described herein may accommodate any size or shape elastic resistance cord or flat band 110. As force is applied to the elastic resistance cord or flat band 110 in the direction of the forward end 170 of the length quick adjustment device 10, the ball 140 rolls along the incline toward the forward end 170 reducing the distance between the ball 140 and the top surface 160 of the chamber. As this distance is reduced, the elastic resistance cord or flat band 110 may become secured between the ball 140 and the top surface 160 of the chamber 130. As force is applied to the elastic resistance cord or flat band 110 in the direction of the rearward end 180 of the length quick adjustment device 10, the ball 140 rolls in the opposite direction along the inclined surface 150, increasing the distance between the ball 140 and the top surface 160 of the chamber, and releasing the elastic resistance cord or flat band 110 within the chamber 130.

Figure 19:
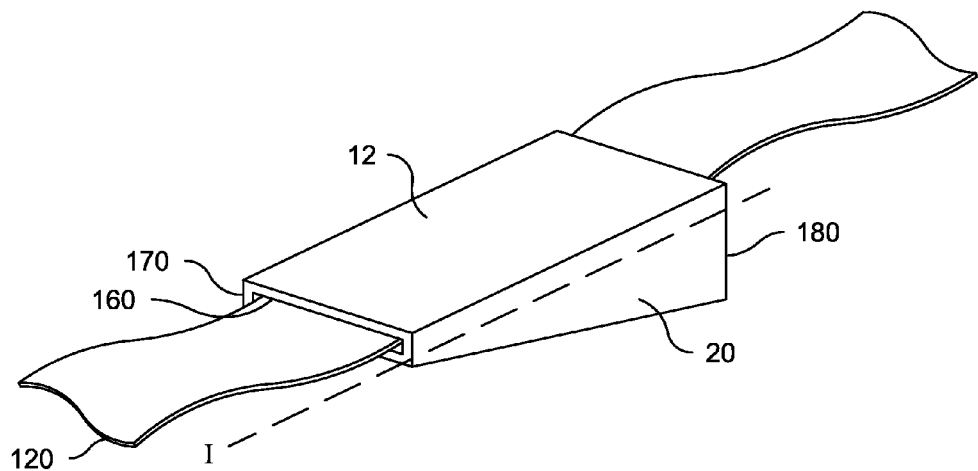
FIG. 19 shows a perspective view of a length quick adjustment device capable of receiving a flat elongated material according to the invention.
Figure 20:
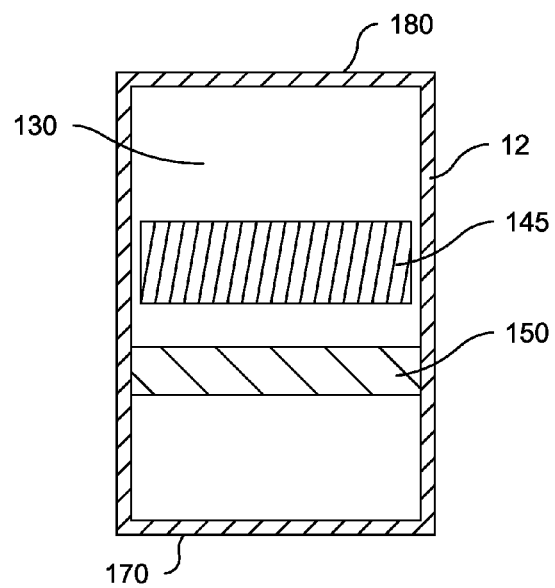
FIG. 20 shows a top cross sectional view of a clip taken at line I as shown in FIG. 19 according to the invention.

In an alternate embodiment, the length quick adjustment device 10 may also receive and secure a flat elongated material 120 passed through the length quick adjustment device. As shown in FIG. 19 and FIG. 20, the length quick adjustment device may contain a cylindrical object 145 generally disposed parallel to the walls of the housing 12 at the forward end 170 and the rearward end 180. In a similar manner, a flat elongated material 120 may be inserted through the length quick adjustment device 10 to a desired position. The inclined surface 150 may be disposed between the side walls 20 of the length quick adjustment device such that the distance between the inclined surface 150 and the top surface 160 is less at the forward end 170 than at the rearward end 180 of the chamber 130. As the elongated material 120 is passed through the length quick adjustment device between the cylindrical object 145 and the top surface 160 toward the forward end 170, the cylindrical object 145 may roll along the inclined surface 150 reducing the distance between the cylindrical object 145 and the top surface 160 and securing the elongated material 120 between the cylindrical object 145 and the top surface 160. The elongated material 120 may be released by pulling in the direction of the rearward end 180 of the length quick adjustment device.

In this manner, the length quick adjustment device 10 may be used to secure the elastic resistance cord or flat band 110 at various positions to increase or decrease the amount of usable length of the elastic resistance cord or flat band 110. Use of the length quick adjustment device as a means of adjustment of the level of resistance of an elastic resistance cord or flat band provides numerous advantages over the prior art. The length quick adjustment device permits a user to quickly and easily vary the level of resistance provided by the elastic resistance cord or flat band. Additionally, by quickly and easily changing the level of resistance, the user's effective range of motion may be readily increased or decreased. In a preferred embodiment, a structure with teeth, such as the locking pinion, enclosed within a housing, may be used to engage the elongated material. Use of a housing will assist in securing the locking pinion, ball, or cylindrical object against the elongated material and overcomes the limitations of the prior art utilizing loosely fitted engagement structures which do not effectively secure the elongated material. Further, in a preferred embodiment, the inclined surface creates a wedged shaped configuration with the top surface thus enabling the length quick adjustment device to better secure the elongated material.

Figure 26:
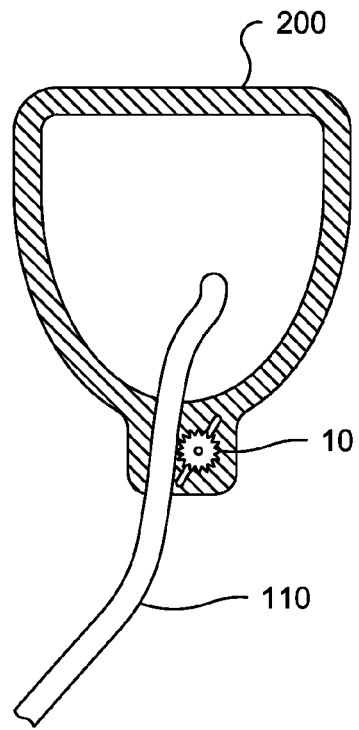
FIG. 26 shows a front elevational view of an exercise device with a cross sectional view of a handle connected directly to an adjustment mechanism which is connected to an elastic resistance cord according to the invention.

As shown in FIG. 9, the elastic resistance cord or flat band 110 may be secured at one end to a stationary object 230, and passed through the length quick adjustment device 10 to secure the length quick adjustment device 10 at a point along the elastic resistance cord or flat band 110. A means for creating tension on the elastic resistance cord or flat band 110, such as a handle 200, may be connected to the length quick adjustment device 10 in order to create tension and resistance on the elastic resistance cord or flat band 110 during exercise. As shown in FIG. 26, the length quick adjustment device 10 may be incorporated into a handle mechanism. As the usable length of the elastic resistance cord or flat band 110 is shortened by repositioning the length quick adjustment device 10, the elastic resistance cord or flat band 110 will provide increasing levels of resistance upon action of the user. Resistance can be increased in this manner as the elastic resistance cord or flat band 110 is required to stretch more relative to its original length over a given range of motion. In this manner, the resistance that the elastic resistance cord or flat band 110 is capable of providing may be varied without the need to change or modify the elastic resistance cord or flat band 110. The length quick adjustment device 10 permits a user to quickly and easily adjust the level of resistance provided by the elastic resistance cord or flat band 110 by simply positioning the length quick adjustment device 10 at a desired length along the elastic resistance cord or flat band 110 and securing the elastic resistance cord or flat band 110 by pulling the cord or flat band toward the forward end 170 of the length quick adjustment device 10. The elastic resistance cord or flat band 110 then may be easily released and repositioned by pulling the elastic resistance cord or flat band 110 toward the rearward end 180 of the length quick adjustment device 10.

Figure 23:
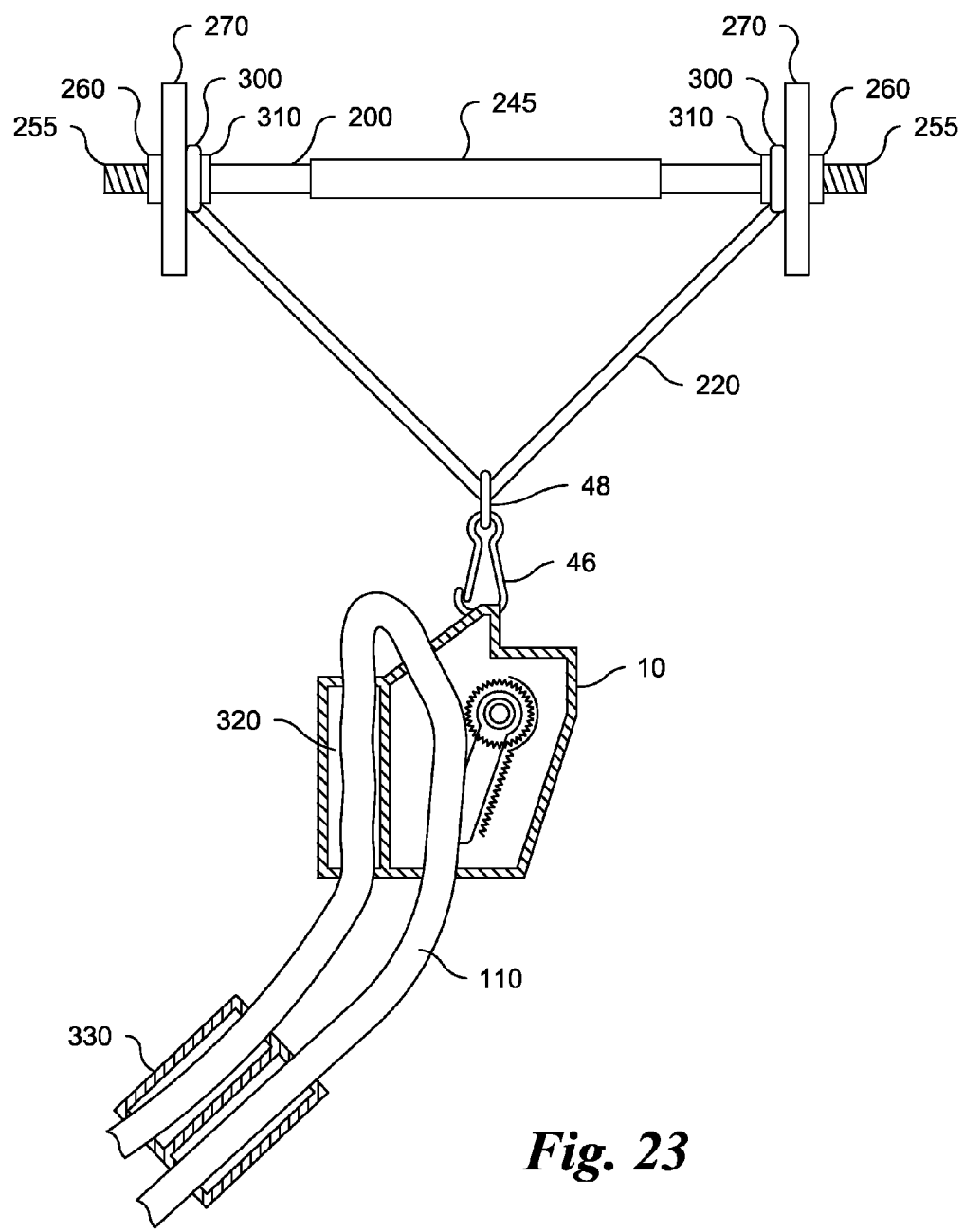
FIG. 23 shows a front elevational view of an exercise device utilizing rings to attach an elastic resistance cord to a handle with cross sectional views of two cord keepers according to the invention.
Figure 24:
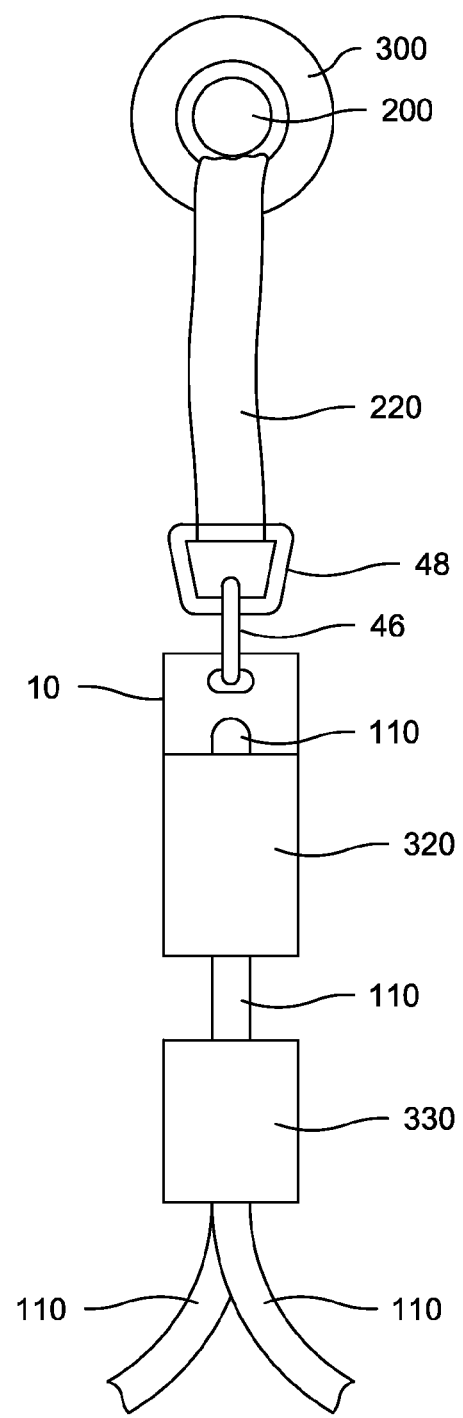
FIG. 24 shows a side elevational view of an exercise device utilizing rings to attach an elastic resistance cord to a handle with cord keepers according to the invention.

As shown in FIG. 23 and FIG. 24, the elastic resistance cord or flat band 110 may be passed through the length quick adjustment device 10 and the length quick adjustment device 10 positioned at a desired length as described. The unused portion of elastic resistance cord or flat band 110 (the portion which is not used to provide resistance) which extends from the length quick adjustment device 10 may interfere with the user's range of motion and become entangled with the user during exercise. Accordingly, a cord keeper 320 may be used to secure this portion of the cord away from the movement of the user. A cord keeper 320 may be molded into the length quick adjustment device 10 to provide a passageway through which the unused portion of the elastic resistance cord or flat band 110 may be directed securely away from the user. Additionally, a cord keeper 330 may be fitted onto the elastic resistance cord or flat band 110 so as to secure the unused portion of the elastic resistance cord or flat band 110 independently of the length quick adjustment device 10. The keeper 330 may contain two passageways, the used portion of the elastic resistance cord or flat band 110 passing through the first passageway to secure the keeper 330 and the unused portion of the elastic resistance cord or flat band 110 being secured by being passed through a second passageway within the keeper 330. In this manner, the unused portion of the elastic resistance cord or flat band 110 will be directed securely away from the user and will not interfere with the movement of the user during exercise.

4. & 5. Attachment Means

Figure 18:
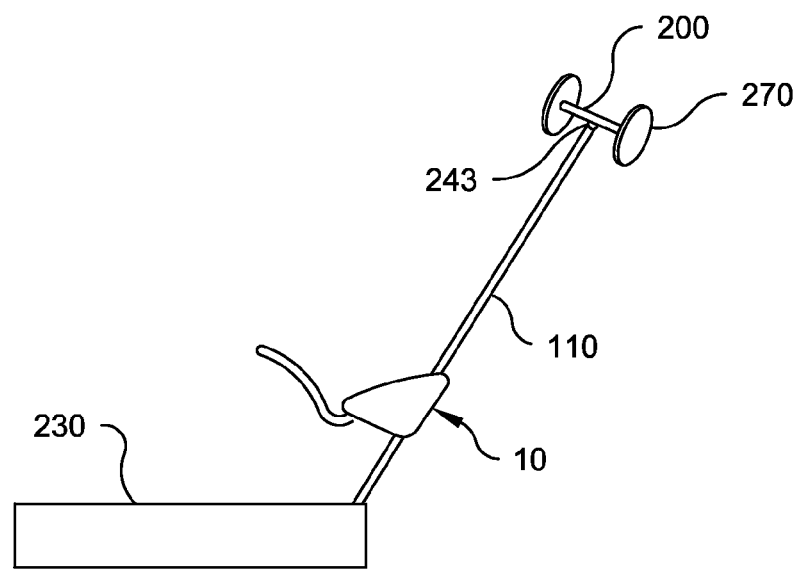
FIG. 18 shows a perspective view of an embodiment of an exercise device utilizing a handle connected to an adjustable elastic resistance cord and passed through a secured length quick adjustment device according to the invention.

As shown in FIG. 18, the length quick adjustment device 10 may also be secured to a stationary object 230 and the elastic resistance cord or flat band 110 passed through and secured to the length quick adjustment device 10. The elastic resistance cord or flat band 110 may be attached at the other end to a means for creating tension on the elastic resistance cord or flat band 110, such as a handle 200, in order to create tension and resistance on the elastic resistance cord or flat band 110 during exercise.

The preferred means of attaching an elastic resistance cord or flat band 110 to a handle 200, a length quick adjustment device 10 to a handle 200, or a length quick adjustment device 10 to a stationary object 230 or other anchoring structure is a finger clip 46 or two sided finger clip 47.

Various exercises may easily be performed with the elastic resistance cords or flat bands, and the level of resistance of the cords or flat bands may be quickly and easily adjusted, by adjusting the position of the length quick adjustment device 10. In one embodiment of the invention, as shown in FIG. 9, a handle 200 may be attached to a length quick adjustment device 10 and the elastic resistance cord or flat band 110 inserted through the length quick adjustment device 10. The handle 200 may be detached from the length quick adjustment device 10 through means of one or more finger clips 46.

Figure 14:
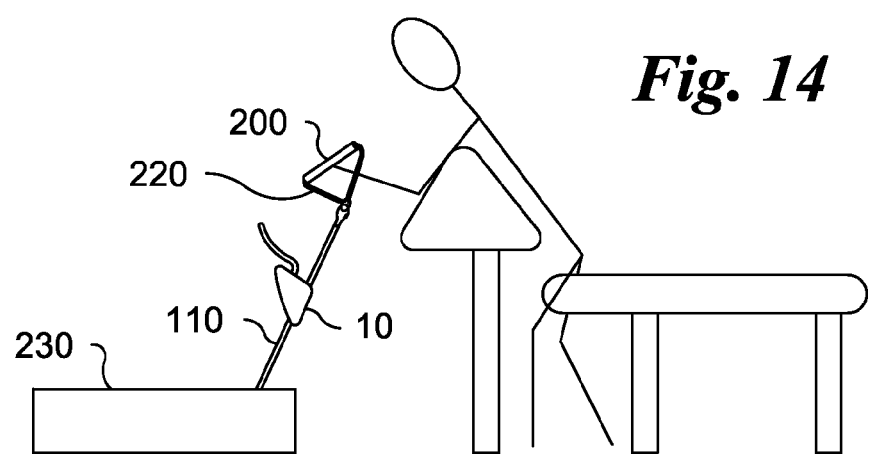
FIG. 14 shows a schematic view of curling exercises being performed utilizing adjustable elastic resistance cords according to the invention.
Figure 15:
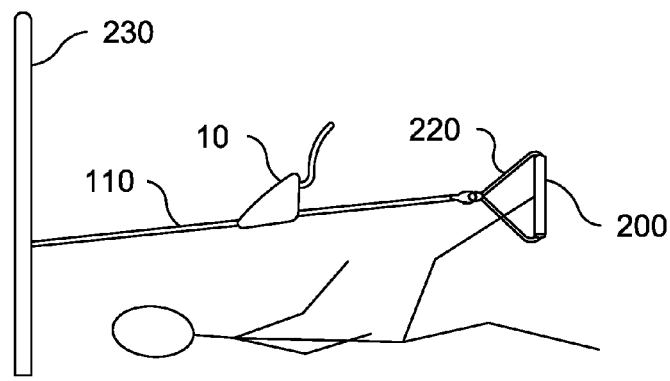
FIG. 15 shows a schematic view of leg extension exercises being performed utilizing adjustable elastic resistance cords according to the invention.

The user may conduct various types of exercise utilizing the invention as described. For instance, as shown in FIG. 14, if the user wished to conduct curling exercises, the user may adjust resistance by repositioning the length quick adjustment device 10 to reduce or increase the effective useable length of the elastic resistance cord or flat band 110 to increase or decrease the strength of the elastic resistance cord or flat band. The user may also vary the amount of weight utilized in the handle 200. In this manner, the user may vary the level of resistance obtained during exercise by minimizing the amount of equipment needed to perform the exercise. By way of further example, as shown in FIG. 15, a user may utilize adjustable elastic resistance cords or flat bands to vary resistance when performing leg extension exercises.

Figure 16:
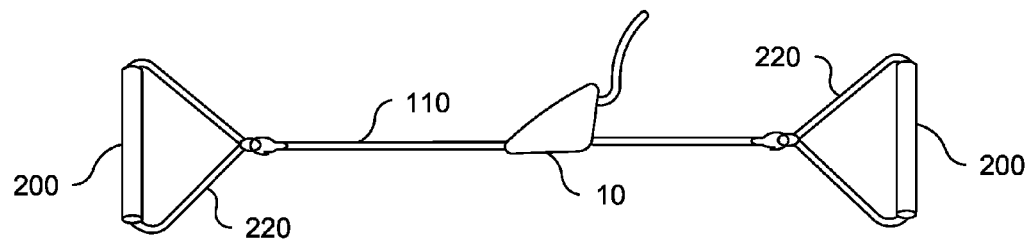
FIG. 16 shows a perspective view of an embodiment of an exercise device utilizing adjustable elastic resistance cords in conjunction with two handles according to the invention.
Figure 17:
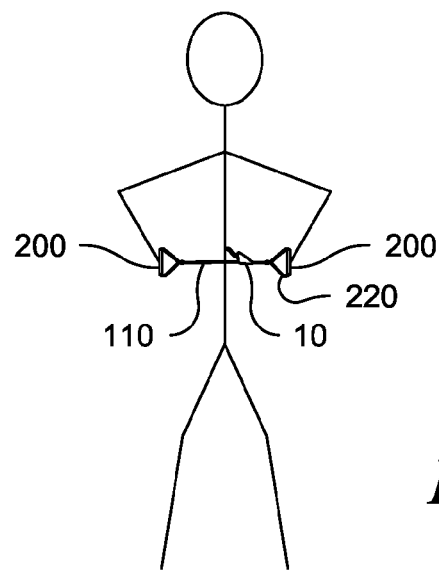
FIG. 17 shows a schematic view of arm extension exercises being performed utilizing adjustable elastic resistance cords and two handles according to the invention.

As shown in FIG. 16, the elastic resistance cord or flat band 110 may also be inserted through a length quick adjustment device 10 which is connected to a handle 200 at one end and the elastic resistance cord or flat band 110 may be connected to another handle 200 at its other end. A finger clip 46 may be interposed between the handles to permit the handles to be detached with respect to each other. In such manner, a user may conduct exercises which involve pulling or pushing the handles in opposing directions. The strength on the elastic resistance cord or flat band 110 increases as the user progresses through his range of motion when conducting the exercise. The user may adjust the level of resistance by repositioning the length quick adjustment device 10 along the elastic resistance cord or flat band 110 to shorten or extend the effective usable length of the elastic resistance cord or flat band 110 being used during the exercise. By way of example, as shown in FIG. 17, a user may engage both handles at a starting position in front of his body and separate the handles against the resistance of the elastic resistance cord or flat band 110.

During exercise, a user may wish to pass the elastic resistance cord or flat band 110 around his neck, back, or other area of the his body, and the various components of the system may become uncomfortable against his body. Accordingly, to increase the level of comfort and effectiveness of the workout, a foam tubular shaped structure may be fitted around the elastic resistance cord or flat band 110 and other components of the system to cushion the user from these components. The foam tubular shaped structure may be split along one side along its length so as to permit the structure to easily open to be fitted around the components of the exercise system.

To provide a user with a means to gauge the level of resistance provided by an elastic resistance cord or flat band 110, the elastic resistance cord or flat band 110 may contain markings specifying the level of resistance provided when the length quick adjustment device 10 is moved to various positions along the elastic resistance cord or flat band 110. The markings may be apparent through specific marks along the elastic resistance cord or flat band 110 or through various color markings.

Another means of adjustment of the elastic cord or flat band resistance used in combination with another form of resistance includes replacing the elastic resistance cord or flat band 110 with one of a different length. In this manner the usable length of the elastic resistance cord or flat band 110 may be varied by changing the cord or flat band. Further, the elastic resistance cord or flat band 110 may be changed and substituted by a cord or flat band of a different strength of resistance (for instance, a thicker cord or flat band). Finally, the level of elastic resistance, used in combination with another form of resistance, may be varied by the addition of more than one elastic resistance cord or flat band 110.

The exercises that may be performed utilizing adjustable elastic resistance cords or flat bands in this manner are not limited to the embodiments described herein, and it is to be understood that the invention encompasses numerous other embodiments of the invention which utilize adjustable elastic resistance cords or flat bands alone or in conjunction with weights as described.

Further, the use of the length quick adjustment device is not limited to the embodiments described herein, and the invention contemplates that the length quick adjustment device may be utilized in conjunction with any elongated material. Contemplated uses include attachment to ropes, items of clothing such as belts, shoelaces, and tie strings. It is to be understood that the invention encompasses numerous other uses of the length quick adjustment device attached to an elongated material.

1. Hand Engagement Structures

And Means of Attaching Weight

Figure 11:
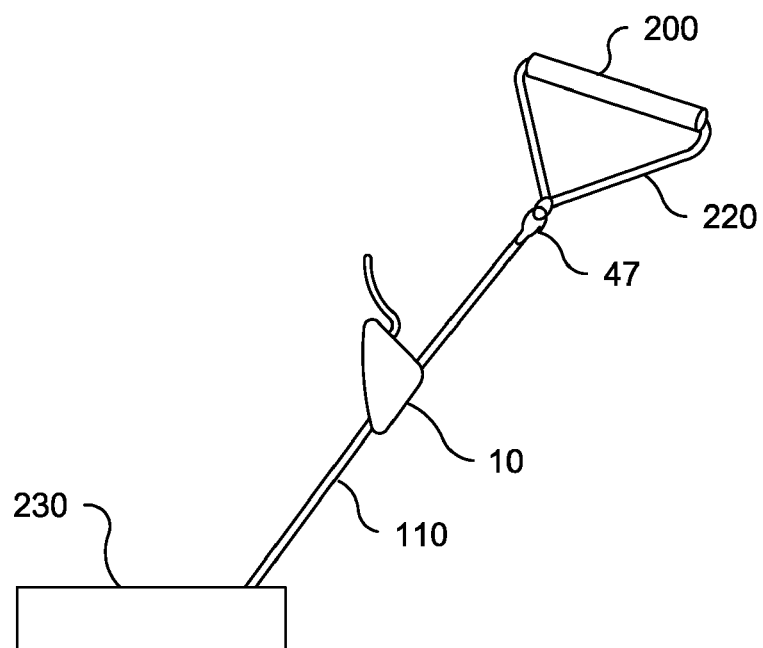
FIG. 11 shows a perspective view of an embodiment of an exercise device utilizing a handle connected to a length quick adjustment device secured to an elastic resistance cord by means of a strap according to the invention.

In a preferred embodiment, as shown in FIG. 11, the handle may be connected to the length quick adjustment device by means of an adjustable or non-adjustable strap 220 which is secured to a point along the elastic resistance cord or flat band 110. The length quick adjustment device 10 may be connected to the strap by a finger clip 46 located on the strap 220. The handle 200 may have a hollow cavity 250, and the strap 220 may be connected to the handle by passing the strap through the cavity of the handle. The handle may also be a foot engagement structure such that the handle is of sufficient size so as to permit a user to place his foot or ankle between the strap 220 and the handle 200 in order to conduct leg exercises.

Figure 10:
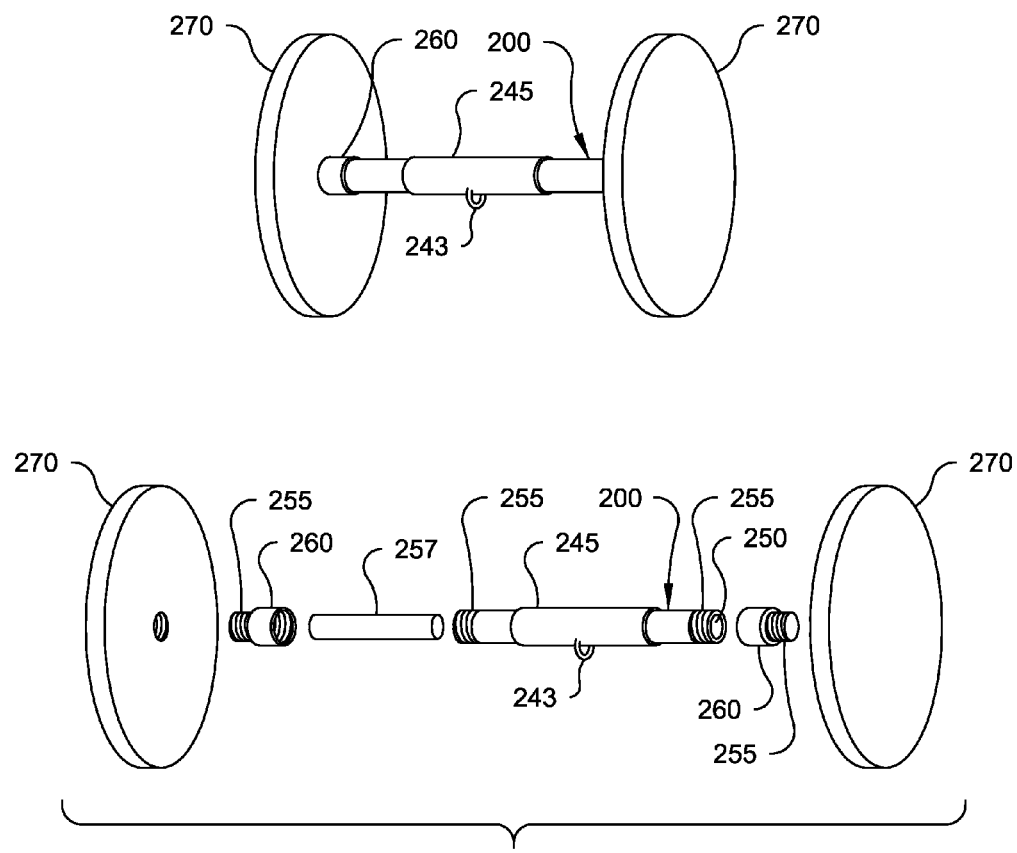
FIG. 10 shows a perspective view and an exploded perspective view of a handle according to the invention.

The weight of the handle 200 may be fixed or may be varied. As shown in FIG. 10, the weight of the handle 200 may be fixed or may be varied by adding or removing weights to the handle 200. Weights may be added to vary the weight of the handle by any means. By way of example, in a preferred form, the handle 200 may define an interior cavity 250 capable of receiving additional weights. The handle 200 may also contain threads 255 at each end capable of receiving a cap 260 at each end to enclose the cavity 250. A plug may also be used to enclose the cavity 250. The weight of the handle 200 may be varied by adding a weighted slug 257 into the cavity 250 of the handle. The handle 200 or the cap 260 may also contain threads 255 at each end capable of receiving an external weight 270 screwed onto the handle 200 at each end. The handle may contain a stop 310 such that the external weight 270 can be screwed or placed onto the handle 200 to a specified distance from the end of the handle 200. Additionally, the length of the handle 200 may be adjustable by adding sections.

The cap 260 may also be large enough to prevent the external weight 270 from loosening and passing over the cap so as to become detached from the handle 200. The cap 260 may also contain a means for securing the cap, such as a cotter pin positioned through the cap and into the cavity 250 of the handle to prevent the cap from loosening and prevent the external weight 270 from inadvertently becoming loose and being removed from the handle.

By way of example, the weight of the handle 200 may be varied between one, two, and three pounds by varying the combination of weights added to the handle 200. The handle 200 may be caused to weigh approximately one pound by inserting a one pound slug 257 into the cavity 250 of the handle. The handle 200 may weigh approximately two pounds if the slug 257 is removed and two external weights, each weighing one pound, are attached to each end of the handle 200. The handle 200 may be caused to weigh three pounds if the slug 257 is inserted into the cavity 250 and two external weights are attached to each end of the handle 200. Any combination of weights of slugs and external weights may be used. The invention contemplates that the weight of the slugs and external weights may be varied, and the invention is not limited to the weight values described herein.

Figure 21:
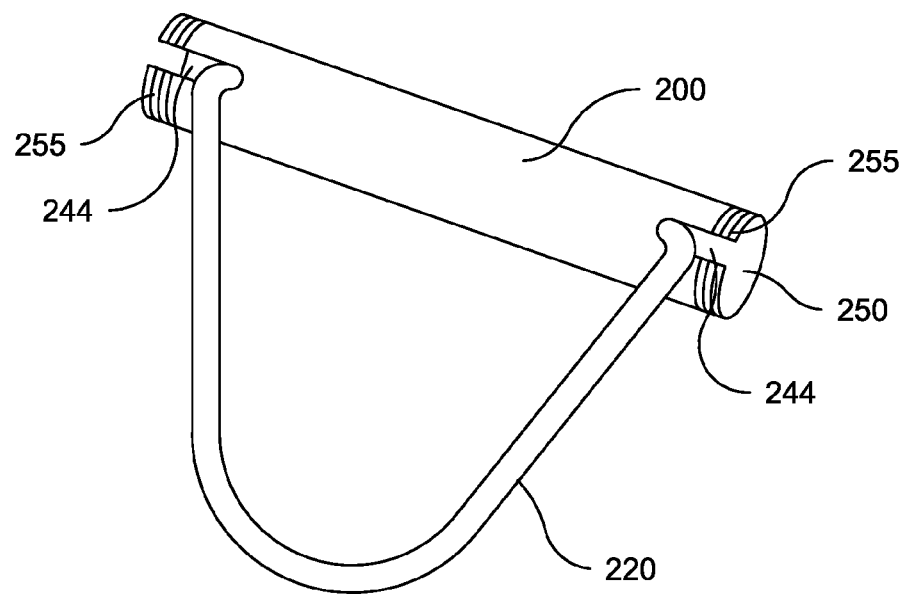
FIG. 21 shows a perspective view of a strap and a handle with channels for receiving the strap according to the invention.

As shown in FIG. 21, in an alternate preferred embodiment, the handle 200 may define channels 244 disposed at each end and along one side of the handle. Threads 255 on the handle may be disposed near to the ends of the handle with the channels 244 extending further from the ends of the handle than the threads 255. In this manner, when the strap 220 is connected to the handle by passing through the cavity 250, the strap 220 may be positioned in the channels 244 at each end of the handle without coming into contact with weights which may be also be attached at each end of the handle.

In another preferred embodiment, as shown in FIG. 23 and FIG. 24, the elastic resistance cord or flat band 110 may be connected to the handle 200 by means of a strap 220 which is attached at each end to the handle 200 by means of rings 300 capable of sliding over each end of the handle 200. The rings 300 may be sewn or otherwise attached to each end of the strap 220. The rings 300 may be easily mounted onto the handle 200 by sliding the rings 300 onto the handle from each end of the handle until the rings come into contact with a stop 310 to prevent the rings from sliding further towards the handgrip 245. The elastic resistance cord or flat band 110 may be easily detached from the handle 200 by sliding the rings toward the ends of the handle 200 until removed from the handle. The strap may be connected to a slip free length quick adjustment device 10 through which the elastic resistance cord or flat band 110 passes.

Figure 25:
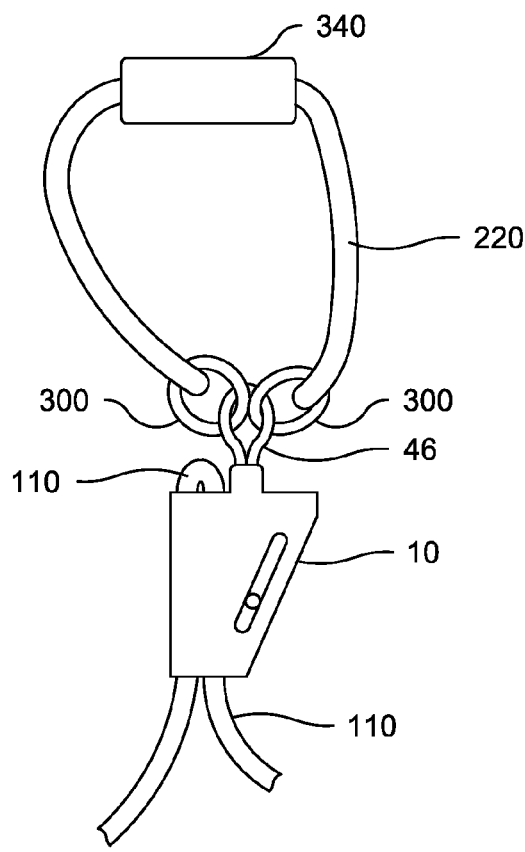
FIG. 25 shows a front elevational view of an exercise device utilizing rings to secure an elastic resistance cord to a strap according to the invention.

As shown in FIG. 25, in another preferred embodiment, the user may remove the handle 200 and conduct exercises by grasping the strap 220 without the handle 200. In this embodiment, the handle 200 may be removed by sliding the rings 300 off of the handle. The rings 300 may be connected to each other via one or more finger clips 46 to form a loop, and the rings 300 may also be connected to the slip free length quick adjustment device 10 via one or more finger clips 46. In this manner, as the elastic resistance cord or flat band 110 is passed through the slip free length quick adjustment device 10, the strap 220 may be secured to the elastic resistance cord or flat band 110. A strap grip 340 constructed of a pliable material may be positioned around the strap so that a user may grasp the strap grip 340 and reduce injury to his hands or feet when conducting exercises utilizing this embodiment of the invention. The strap grip 340 may easily slide along the strap to reposition the strap grip during periods when the strap grip is not in use.

Figure 12:
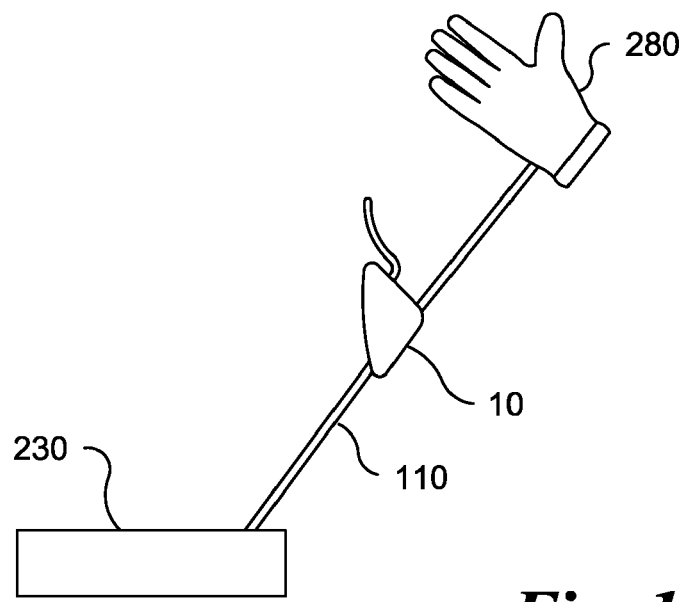
FIG. 12 shows a perspective view of an embodiment of an exercise device utilizing a glove and an adjustable elastic resistance cord secured at one end according to the invention.

A handle 200 is a preferred hand engagement structure attached to an elastic resistance cord or flat band 110 to enable a user to conduct exercises. However, additional hand engagement structures may be utilized. In another preferred embodiment, as shown in FIG. 12, the length quick adjustment device 10 or one or more elastic resistance cords or flat bands 110 may be attached to an article of clothing, such as a glove 280 or mitten (weighted or non-weighted). The glove may also be attached to a plurality of elastic resistance cords or flat bands. The glove or a pair of gloves may contain weights to provide increased weight resistance to the glove along with a means of attaching an elastic resistance cord or flat band. The means of attaching the elastic resistance cord or flat band may also contain an adjustment mechanism for adjusting the length of the elastic resistance cord or flat band in use during exercise. The glove may also be detached from the elastic resistance cord or flat band. Accordingly, the glove may have no resistance, weight resistance only, elastic resistance, or a combination of both elastic resistance and weight resistance.

Another preferred hand engagement structure is a dumbbell, attached to the elastic resistance cord or flat band 110. The dumbbell or dumbbells may have fixed or preferably adjustable weights. The elastic resistance cord or flat band may be attached to the dumbbell by any means including the means for attaching an elastic resistance cord or flat band to a handle 200 as described herein. However, the preferred means of attaching an elastic resistance cord or flat band to the dumbbell is by means of a strap 220 as described. The dumbbell may also be detached from the elastic resistance cord or flat band. Accordingly, the dumbbell may have no resistance, weight resistance only, elastic resistance, or a combination of both elastic resistance and weight resistance.

Figure 13:
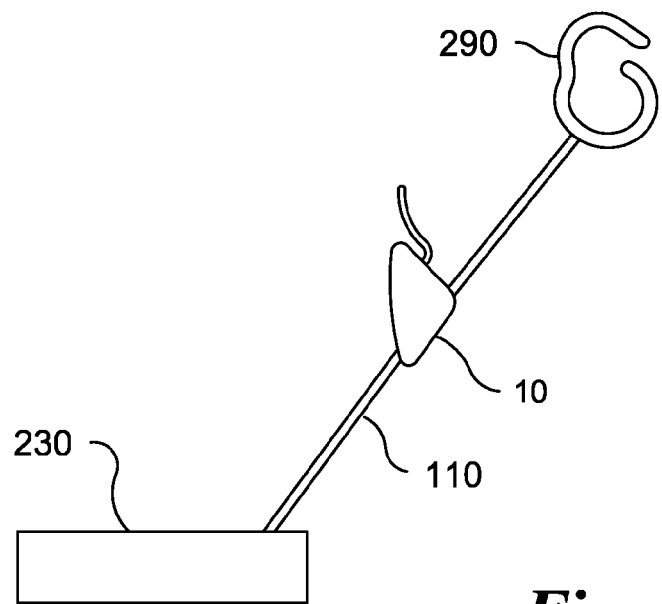
FIG. 13 shows a perspective view of an embodiment of an exercise device utilizing a harness capable of being fitted to a user and an adjustable elastic resistance cord secured at one end according to the invention.
Figure 22:
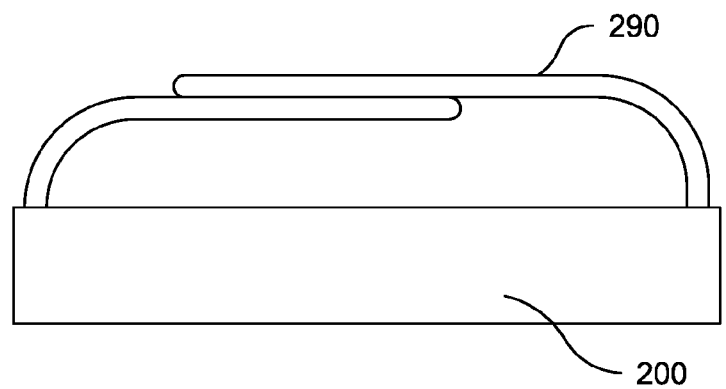
FIG. 22 shows a front elevational view of a handle with a harness according to the invention.

In another embodiment, as shown in FIG. 13, the elastic resistance cord or flat band 110 itself, or a plurality of elastic resistance cords or flat bands, may be attached to an adjustable or non-adjustable harness 290 fitted to a hand, arm, foot, leg, or other bodily component of the user. For instance, the harness may be attachable by connecting ends of the harness using velcro, a buckle, or some other means. As shown in FIG. 22, the harness may be attached to the handle 200 to provide an additional means to secure the handle to a bodily part of the user so that the user need not apply as much pressure to grip the handle.

The elastic resistance cord or flat band 110 may also be formed into a loop and connected to itself using a finger clip 46. The loop may then be fitted around the user to conduct exercises. The elastic resistance cord or flat band 110 may also be weighted. Use of a harness or a looped elastic resistance cord or flat band provides certain advantages while exercising including reduction of hand fatigue and cramping, lowered blood pressure, longer workouts, and they are easily fitted to any body part of the user. The elastic resistance cord or flat band 110 may be connected to a hand engagement structure by any means and may be permanently affixed to the hand engagement structure or removable.

6. Anchoring Structures

As described herein, the elastic resistance cord or flat band 110 may be attached at one end directly to a hand engagement structure (such as a handle) or may be passed through the length quick adjustment device 10, which may be connected directly or indirectly to a hand engagement structure, to enable the user to adjust the amount of resistance of the elastic resistance cord or flat band 110. In order to provide resistance, the elastic resistance cord or flat band 110 should be anchored at the other end.

The elastic resistance cord or flat band 110 may be anchored to an anchoring structure at its other end permitting the user to conduct various exercises. The anchoring structure may be (1) a stationary object 230, such as a floor, wall, ceiling or pole. (2) Alternatively, the elastic resistance cord or flat band 110 may be anchored by being attached to a piece of stable but moveable equipment such as an aerobic step, bench, balance board, ball, sphere, hemisphere, a weight or weight plate, dumbbell, barbell, kettle bell, or even a stable piece of furniture. In a similar manner, the elastic resistance cord or flat band 110 may anchored to (3) any article of clothing such as a wrist weight, ankle weight, vest, shirt, pant, short, belt, jacket, jersey, coat, shoe, sock, stirrup, or footwear of the user or another individual. The elastic resistance cord or flat band 110 may also be anchored to (4) the body of the user or another individual. In such manner, the user is able to conduct exercises at any location regardless of his surrounding environment.

Board, Pad, Aerobic Step, or Bench

Figure 28:
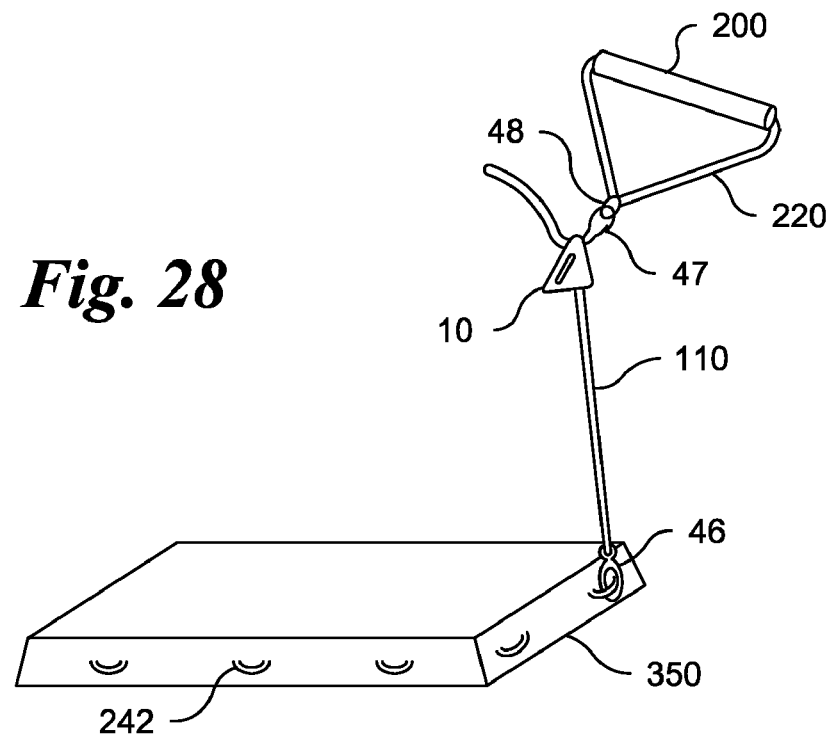
FIG. 28 shows a perspective view of an embodiment of an exercise device utilizing an adjustable resistance cord and a handle with a pad as an anchoring structure according to the invention.

In a preferred embodiment, the elastic resistance cord or flat band 110 may be anchored to an aerobic step or bench utilizing any means of attaching an elastic resistance cord or flat band 110. In another preferred embodiment, as shown in FIG. 28, the elastic resistance cord or flat band 110 may be anchored to a secure but moveable structure such as a pad 350 or board and may be anchored to loops on the pad to permit the elastic resistance cord or flat band to swivel in relation to the pad. The elastic resistance cord or flat band may also be passed through a length quick adjustment device which is anchored to the pad.

The pad may consist of a cushion attached to a board. The cushioned surface may be fixed or removable, but in a preferred embodiment, the padded surface is permanently attached to a board. The board preferably contains non-slip structures, such as rubber feet 360, in a non-slip pattern on the side opposite the padded surface. The edge of the pad is preferably sloped for further stability. The pad may be of any shape or size but preferably should be of a flat construction in a square or rectangular shape so as to permit a user to stand, squat, sit, kneel, or lie on the pad, in a variety of positions, while conducting exercises. The pad may also comprise an exercise mat.

The pad may contain one or more loops to serve as attachment points for the cord or flat band, and one or more elastic resistance cords or flat bands 110 may be attached to the loops by means of fingers clips 46. The elastic resistance cord or flat band may be permanently attached to the pad but is preferably detachable so as to be able to be moved to different positions on the pad for different types of exercises. The elastic resistance cord or flat band 110 may also be anchored by being passed around the pad 350 and secured to itself by means of a finger clip 46.

The pad may also rest on a base structure, which supports and elevates the pad, such as an aerobic step, stool, table, bench, spring board, or trampoline. The pad may also be placed under such structure and may also be free standing. In a preferred usage, the pad, or other moveable structure, is a flat structure and not elevated by feet or any other structure.

The pad, or other anchoring structure, may be positioned over or under an interactive television (TV) structure 430 such as the Wii™ fitness board in order to enhance the number and types of exercise that can be performed with the interactive TV structure 430. The pad, or other anchoring structure, may also be free standing. Further, the interactive TV structure 430 may contain loops 242 or other attachment structures for attachment of the elastic resistance cord or flat band 110.

Figure 31:
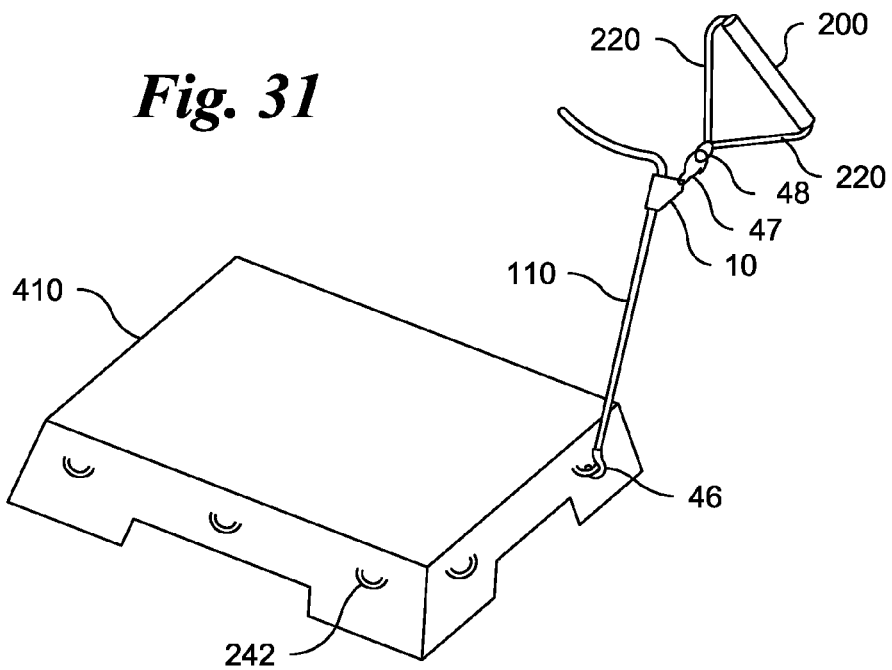
FIG. 31 shows a perspective view of an embodiment of an exercise device utilizing an adjustable resistance cord and a handle with an aerobic step as an anchoring structure according to the invention.
Figure 32:
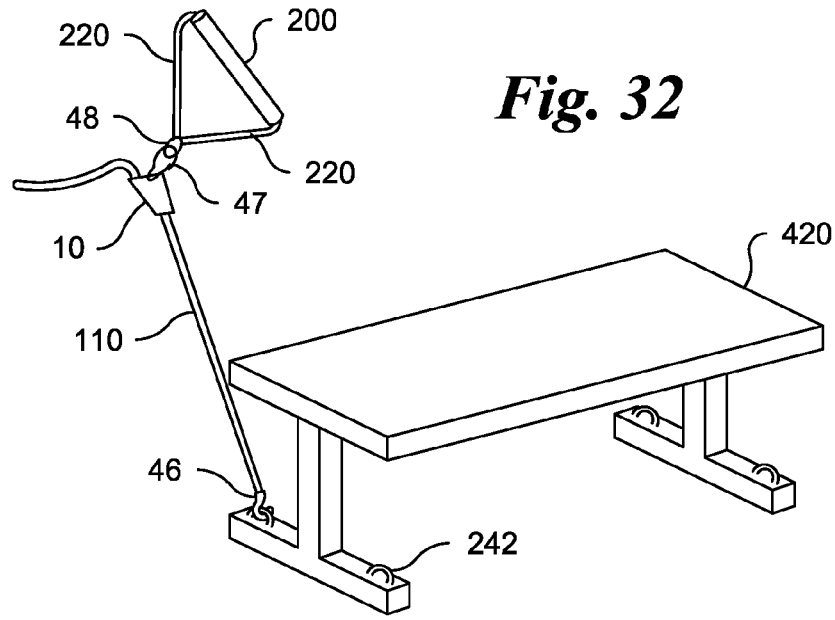
FIG. 32 shows a perspective view of an embodiment of an exercise device utilizing an adjustable resistance cord and a handle with an exercise bench as an anchoring structure according to the invention.
Figure 33:
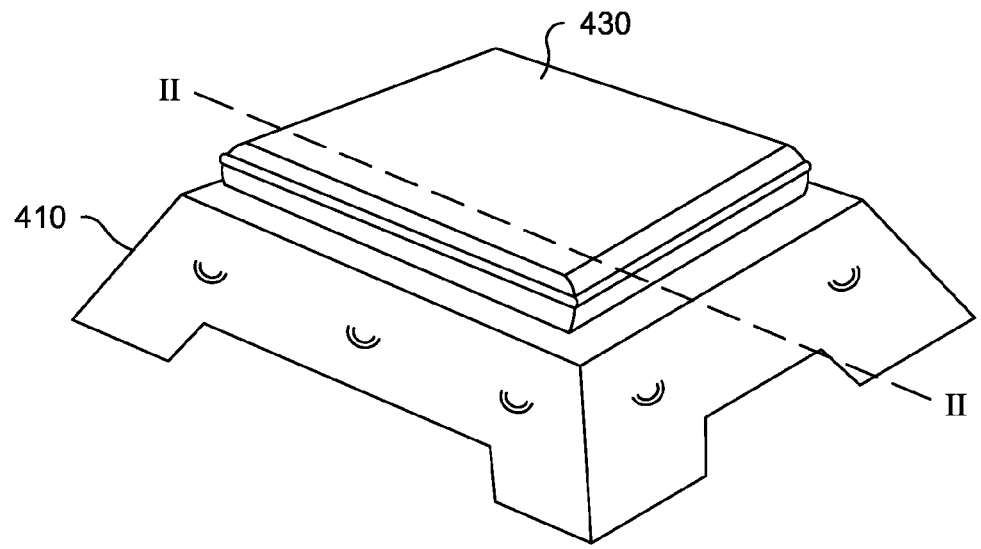
FIG. 33 shows a perspective view of an aerobic step and an interactive TV structure fitted into the aerobic step according to the invention.
Figure 34:
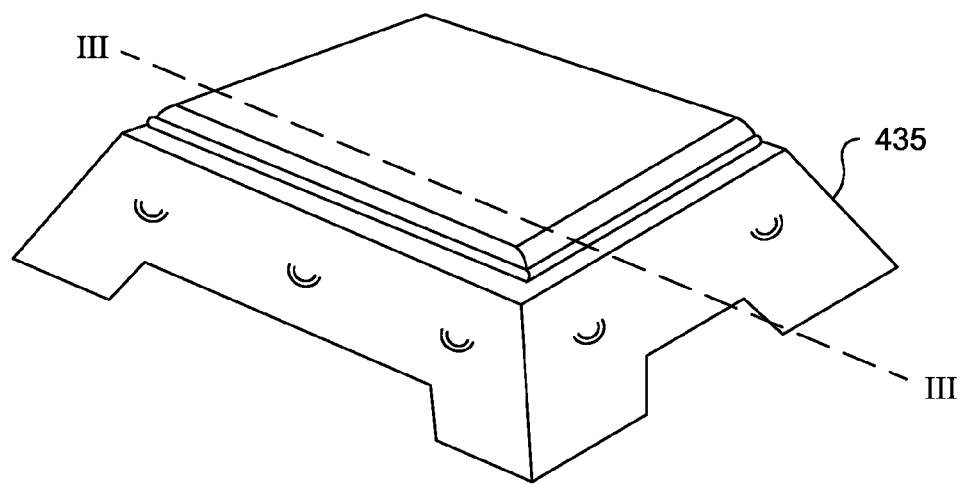
FIG. 34 shows a perspective view of an aerobic step with interactive TV structure capabilities according to the invention.
Figure 35:
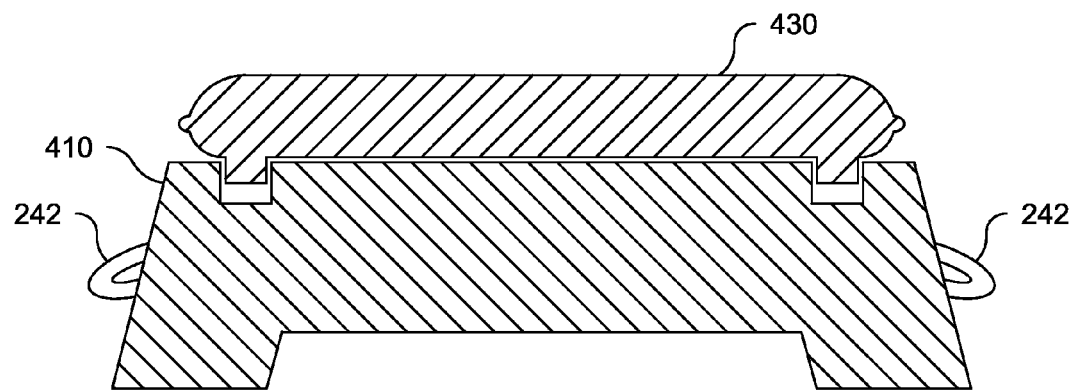
FIG. 35 shows a side cross sectional view of an aerobic step and interactive TV structure taken at line II as shown in FIG. 33 according to the invention.
Figure 36:
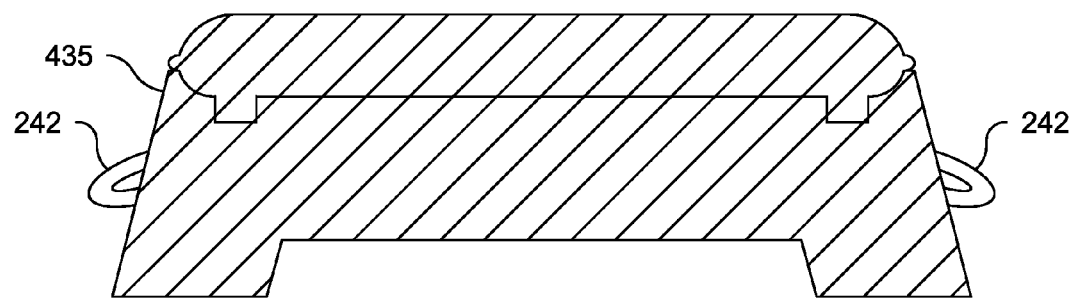
FIG. 36 shows a side cross sectional view of an aerobic step with interactive TV structure capabilities taken at line III as shown in FIG. 34 according to the invention.

The interactive TV structure 430 may also be elevated so as to permit a user to step onto the interactive TV structure during exercise. When elevated as such, the interactive TV structure functions as an aerobic step and further retains its capability to interact with a TV during exercises. In another embodiment, an aerobic step 410 or exercise bench may be used to elevate an interactive TV structure. FIG. 31 shows an aerobic step 410 attached to an elastic resistance cord or flat band and used as an anchoring mechanism. FIG. 32 shows an exercise bench 420 attached to an elastic resistance cord or flat band and used as an anchoring mechanism. As shown in FIGS. 33 and 35, the aerobic step 410 may have a flat surface which contains depressions for receiving the interactive TV structure 430. An exercise bench may also be utilized to receive an interactive TV structure. The aerobic step or exercise bench may also contain a hollow storage area for storage of the interactive TV structure. As shown in FIGS. 34 and 36, an interactive TV structure may also be incorporated into an aerobic step such that the aerobic step is capable of interacting with a TV and displaying data on the TV associated with exercise. Similarly, the interactive TV structure may also be incorporated into an exercise bench. The aerobic step or exercise bench may also be used separate from the interactive TV structure 430, and the aerobic step 410 or exercise bench 420 may also contain loops 242 or other means of attaching elastic resistance cords or flat bands 110, a length quick adjustment device 10, or other exercise devices.

Figure 37A:
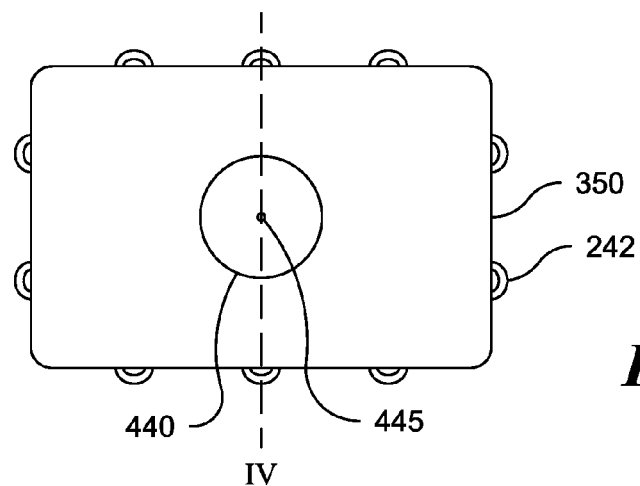
FIG. 37A shows a top elevational view of a pad with rotation disk according to the invention.
Figure 37B:
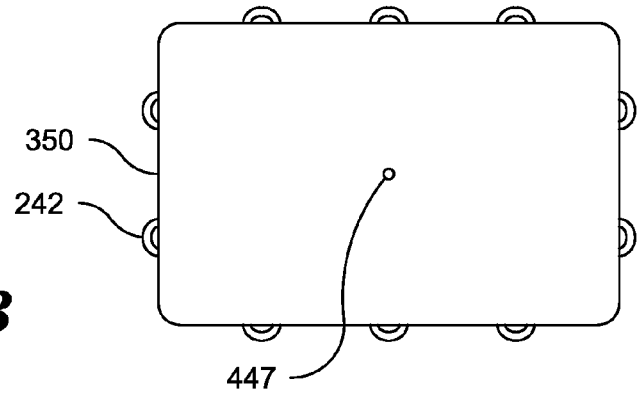
FIG. 37B shows a top elevational view of a pad with hole capable of receiving a rotation disk according to the invention.
Figure 37C:
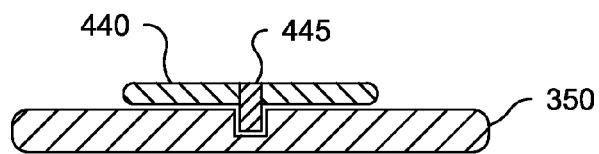
FIG. 37C shows a side cross sectional view of a pad with rotation disk taken at line IV as shown in FIG. 37A according to the invention.

As shown in FIGS. 37A to 37C, the pad may be fitted with a rotation disk 440 whereby a user standing on the disk may conduct exercises by twisting and rotating his body in relation to the pad. Such exercise will permit the user to exercise an extensive variety of muscles including abdominal and leg muscles. The rotation disk 440 may contain a mounting post 445 which may be inserted into a hole 447 in the pad 350 or other anchoring structure to permit rotation of the disk. The disk may be permitted to rotate freely to allow the user to twist and rotate as far as desired to achieve the desired results during exercise.

Use of a pad as an anchoring structure overcomes the limitations of the prior art as it permits the user to easily transport the exercise device and allows for a great variety of exercise routines and workouts. The pad is lighter, more compact, and more easily portable. Further, the pad is less expensive than the exercise platform of the prior art. As it is padded, the pad is more comfortable to use, and due to its compact nature and generally flat construction, is more versatile allowing for a greater number of exercises to be performed. Further, because of its generally flat construction, the pad is safer to use in that it a user may not step on uneven surface points.

Figure 29:
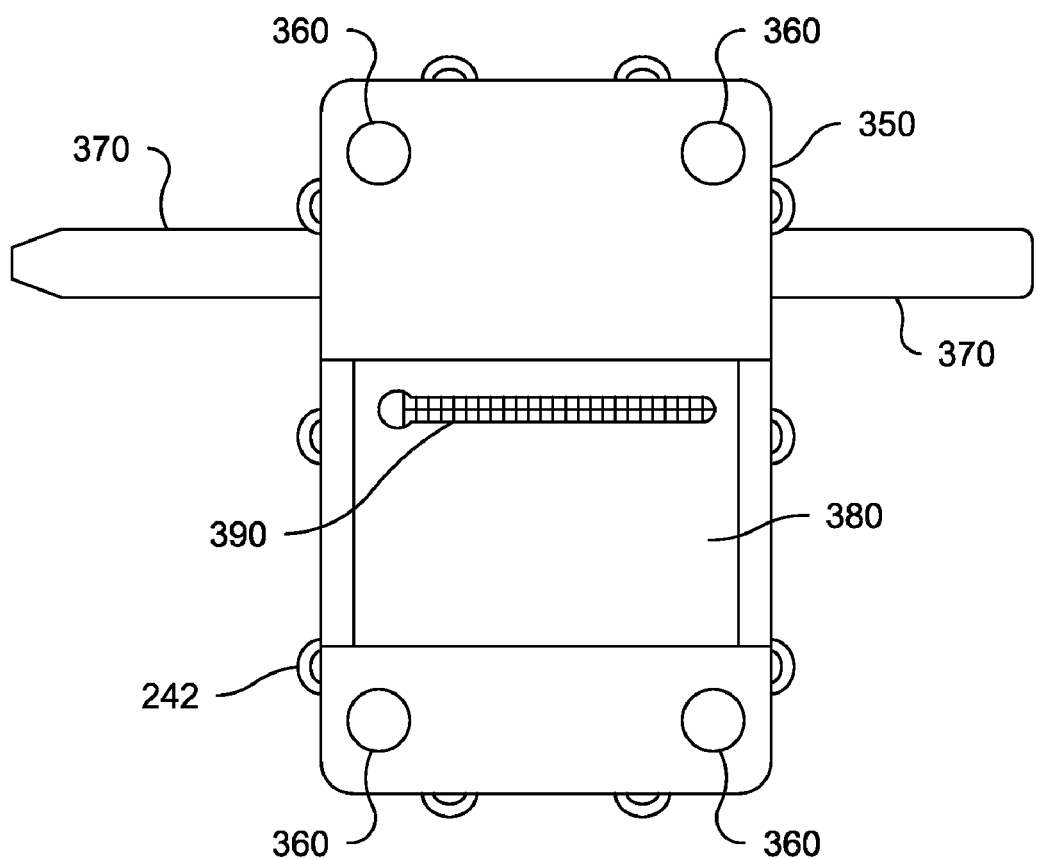
FIG. 29 shows a bottom elevational view of a pad according to the invention.

As shown in FIG. 29, an adjustable strap 370 may be attached to the pad 350 such that the pad 350 may be secured to various structures such as the back of a chair for exercises involving sitting. The adjustable strap 370 may also be used as an aid in carrying the pad when not in use. The adjustable strap 370 may be attached to the pad 350 with grommets such that the adjustable strap is able to swivel in relation to the pad.

The pad 350 may also contain one or more storage pockets 380, preferably on the side opposite the padded surface in order to store various workout and personal articles, including but not limited to elastic resistance cords or flat bands, clothing, gloves, belts, head bands, wrist bands, watches, money, and other items. The storage pockets may be encloseable with a zipper mechanism 390, a velcro mechanism, or other means of closing the storage pocket.

Additionally, the elastic resistance cord or flat band 110 may be anchored to a non-stationary object such as another handle or another elastic resistance cord or flat band 110. In such manner, resistance may be generated as force is applied in opposing directions to opposite ends of the elastic resistance cord or flat band 110 or string of elastic resistance cords or flat bands 110.

The elastic resistance cord or flat band may be anchored to an anchoring structure through use of a finger clip 46 directly, by connecting the cord or flat band to itself with a finger clip and forming a loop around the anchoring structure, or by some other means of attachment to the anchoring structure. The elastic resistance cord or flat band 110 may be permanently affixed to the anchoring structure or may be removable. The elastic resistance cord or flat band 110 may be removably anchored by means of finger clips 46 so as to permit the exercise system to be transported and used at various locations. An elastic resistance cord or flat band 110 may be anchored and secured to any anchoring structure so that tension is created when a user applies force to the other end of the elastic resistance cord or flat band 110.

Accessories

Various accessories may also be used as hand engagement structures or anchoring structures (such as the pad 350) to enhance the exercise workout of the user. For instance the elastic resistance cord or flat band 110 may be anchored to (1) an article of clothing such as a vest, belt, glove, or other article. The elastic resistance cord or flat band may also be (2) wrapped around an anchoring structure and connected to itself to form a loop. The elastic resistance cord or flat band may be (3) attached to a bar. The elastic resistance cord or flat band may also be (4) attached to a harness which is connected to an anchoring structure. The elastic resistance cord or flat band may also be used in conjunction with (5) one or more additional elastic resistance cord or flat bands. Additionally, (6) weights may be connected to a handle to increase the amount of resistance provided by the handle. Further, (7) an abdominal exercise device comprising a bar and a roller may be attached to elastic resistance. (8) A mat may also be placed under the pad or a user may use the mat for additional floor exercises.

Additionally, the elastic resistance cord or flat band 110 or length quick adjustment device 10 may be connected to a harness attached to a user. The harness may be attached around the neck of a user to conduct neck exercises, around the wrists or ankles of the user to conduct arm or leg exercises, or some other portion of the user to engage in the desired exercise. As the user moves during exercise, force is transferred from the harness to the elastic resistance cord or flat band which provides resistance against the movement of the user.

Figure 30:
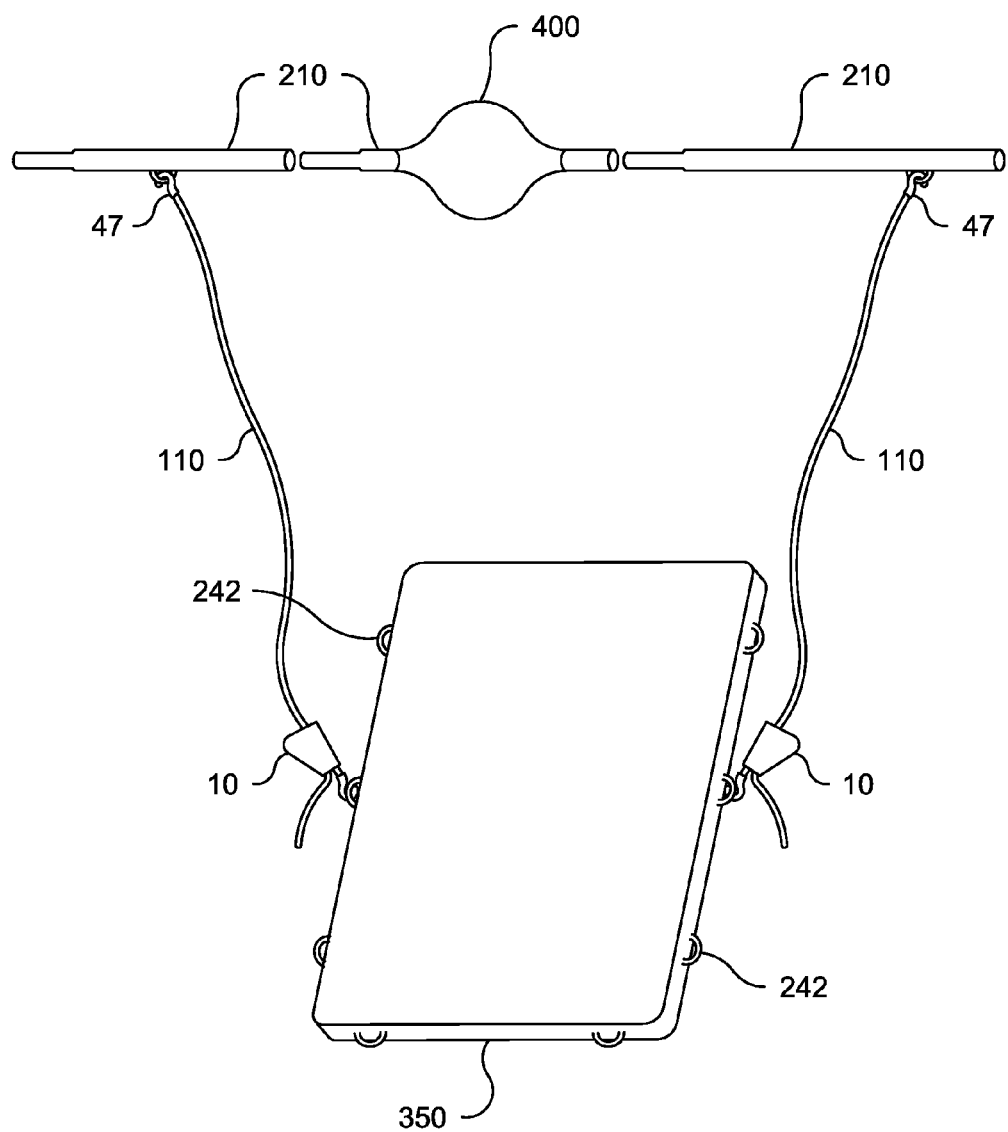
FIG. 30 shows a perspective view of an embodiment of an exercise device utilizing a handle with extension sections and a roller according to the invention.

Handles, bars, grips, gloves, and weights as described herein are hand engagement structures which may also be used in combination with elastic resistance cords or flat bands according to the invention. The elastic resistance cord or flat band 110 or the length quick adjustment device 10 may also be attached to a bar such as a barbell. As shown in FIG. 30, a handle, capable of extension by adding bar sections to the ends of the handle, may also be utilized to conduct exercises according to the invention. Sections of the handle may contain male and female ends so that a male end may be fitted to a female end to extend the length of the handle 210. One or more elastic resistance cords or flat bands 110 may be attached to the handle 210 at one end and one or more elastic resistance cords or flat bands may be passed through a length quick adjustment device 10 attached to a pad 350. A roller 400 may be rotably attached such that the handle 210 is passed through the roller and the roller is permitted to freely rotate around the handle. In such manner, the user may conduct exercise by engaging the bar or extended handle and pushing against the resistance of the elastic resistance cord or flat band 110.

If the roller 400 is attached to the handle 210, a user may conduct exercises by placing the roller 400 on a floor surface and positioning himself or herself on the pad 350. The user may then push on the handle 210 allowing the roller to roll along the floor surface to extend the handle 210 in a direction away from the pad 350 against the resistance of the elastic resistance cords or flat bands. 110. The amount of resistance may be adjusted by adjusting the position of the elastic resistance cords or flat bands within the length quick adjustment device 10. Thus, various accessories such as a bar, harness, abdominal roller can be attached to the hand engagement structures, to enable an even greater variety of exercises.

In sum, the invention is a revolutionary exercise device that is universal, exercising the entire body, is usable in a variety of positions (e.g. standing, squatting, sitting, kneeling, lying), is usable alone or with other exercise equipment or structures, is expandable (i.e. interfaces with other exercise accessories), is adjustable over a range of resistance, is adjustable over a range of motion, uses different types of resistance, enables the user to conduct different types of exercises (e.g. stretching, aerobics, strength training, toning and shaping), is inexpensive, and is compact and portable. The invention has been disclosed in terms of preferred embodiments which fulfill all of the objects of the present invention and overcome the limitations of the prior art. Various changes, modifications, and alterations from the teachings of the present invention may be contemplated by those skilled in the art without departing from the intended spirit and scope thereof. It is intended that the present invention only be limited by the terms of the appended claims.

We claim:

1. An exercise resistance system comprising:
   an elastic resistance cord having two ends,
   a length quick adjustment device comprising a body defining a passageway for receiving the elastic resistance cord, an inclined surface within the body angularly positioned with respect to the passageway, and a ball or cylinder in contact with the inclined surface and the elastic resistance cord and capable of rolling along the inclined surface which is capable of securing the elastic resistance cord by passing the elastic resistance cord through the length quick adjustment device in a linear manner and pulling the elastic resistance cord in one direction and capable of releasing the elastic resistance cord by pulling the elastic resistance cord in the other direction, the length quick adjustment device being capable of attachment to the elastic resistance cord at any point along the length of the elastic resistance cord,
   a means of attaching the elastic resistance cord to an anchoring structure, and
   a hand or foot engagement structure, which is connected to the length quick adjustment device, whereby a user may apply force to the hand or foot engagement structure in order to conduct exercises.

2. An exercise resistance system as set forth in claim 1 wherein the hand or foot engagement structure is a handle.

3. An exercise resistance system as set forth in claim 2 wherein a harness is connected to the handle such that a bodily portion of a user is capable of being inserted between the harness and the handle to better secure the handle to the user.

4. An exercise resistance system as set forth in claim 1 further comprising weights positioned at any point along the elastic resistance cord.

5. An exercise resistance system as set forth in claim 1 wherein the hand or foot engagement structure is a loop capable of being fitted to a user of the exercise resistance system.

6. An exercise resistance system as set forth in claim 1 wherein the hand or foot engagement structure is a dumbbell.

7. An exercise resistance system as set forth in claim 6 wherein the dumbbell comprises:
 a handle which defines an interior cavity,
 at least one slug which is capable of insertion into the interior cavity of the handle,
 at least one cap capable of being connected to the handle to secure the slug within the interior cavity of the handle, and
 at least one external weight capable of being connected to the handle.

8. An exercise resistance system as set forth in claim 1 wherein the hand or foot engagement structure is a harness which is capable of being attached to a user.

9. An exercise resistance system as set forth in claim 1 wherein the hand or foot engagement structure is a strap which is connected to a handle.

10. An exercise resistance system as set forth in claim 9 wherein the handle contains two ends, the handle containing threads disposed at each end of the handle and the handle further defining a channel disposed at each end of the handle and along one side of the handle, each channel extending further from each end of the handle than the threads, whereby the strap connected to the handle and passing through a cavity within the handle may be passed through each channel in the handle.

11. An exercise resistance system as set forth in claim 1 wherein the hand or foot engagement structure is a glove.

12. An exercise resistance system as set forth in claim 1 wherein the hand or foot engagement structure is a strap, the strap having a first end and a second end, the first end being connected to a first ring, and the second end being connected to a second ring, the first and second rings being slidably connected to a handle having a first end and a second end, the first ring being connected to the first end of the handle by sliding the first ring over the first end of the handle, and the second ring being connected to the second end of the handle by sliding the second ring over the second end of the handle.

13. An exercise resistance system as set forth in claim 1 wherein the hand or foot engagement structure is a strap, the strap having a first end and a second end, the first end being connected to a first ring, and the second end being connected to a second ring, the first and second rings being connected to each other and to the length quick adjustment device by at least one finger clip, and a strap grip being slidably connected around the strap.

14. An exercise resistance system as set forth in claim 1 wherein the anchoring structure is a pad which may be free standing or capable of being placed over or under an interactive TV structure.

15. An exercise resistance system as set forth in claim 1 wherein the anchoring structure is an interactive TV structure.

16. An exercise resistance system as set forth in claim 1 wherein the hand or foot engagement structure comprises at least one handle, being comprised of at least one section, each section having a male end or a female end, and at least one bar having a male end or a female end, the bar being capable of insertion into the end section of a handle.

17. An exercise resistance system as set forth in claim 16 wherein a roller is rotably connected to the handle, the handle being passed through the roller such that the roller is capable of rotating around the handle.

18. An exercise resistance system as set forth in claim 1 wherein the hand or foot engagement structure is a barbell.

19. An exercise resistance system as set forth in claim 1 wherein the hand or foot engagement structure is a bar.

20. An exercise resistance system as set forth in claim 1 wherein the anchoring structure is an aerobic step which may be free standing or capable of being placed over or under an interactive TV structure.

21. An exercise resistance system as set forth in claim 1 wherein the anchoring structure is a pad and the pad contains a pocket whereby various items may be stored within the pocket, the pocket being permanently attached to the pad or removable.

22. An exercise resistance system comprising:
 an elastic resistance cord having two ends,
 a length quick adjustment device comprising a body defining a passageway for receiving the elastic resistance cord, an inclined surface within the body angularly positioned with respect to the passageway, and a ball or cylinder in contact with the inclined surface and the elastic resistance cord and capable of rolling along the inclined surface which is capable of securing the elastic resistance cord by passing the elastic resistance cord through the length quick adjustment device in a linear manner and pulling the elastic resistance cord in one direction and capable of releasing the elastic resistance cord by pulling the elastic resistance cord in the other direction, the length quick adjustment device being capable of attachment to the elastic resistance cord at any point along the length of the elastic resistance cord,
 a means of attaching the length quick adjustment device to an anchoring structure, and
 a hand or foot engagement structure which is attached to one end of the elastic resistance cord.

23. An exercise resistance system as set forth in claim 22 wherein the hand or foot engagement, structure is a handle.

24. An exercise resistance system as set forth in claim 23 wherein a harness is connected to the handle such that a bodily portion of a user is capable of being inserted between the harness and the handle to better secure the handle to the user.

25. An exercise resistance system as set forth in claim 22 further comprising weights positioned at any point along the elastic resistance cord.

26. An exercise resistance system as set forth in claim 22 wherein the hand or foot engagement structure is connected to a loop capable of being fitted to a user of the exercise resistance system.

27. An exercise resistance system as set forth in claim 22 wherein the hand or foot engagement structure is a dumbbell.

28. An exercise resistance system as set forth in claim 27 wherein the dumbbell comprises:
 a handle which defines an interior cavity,
 at least one slug which is capable of insertion into the interior cavity of the handle,
 at least one cap capable of being connected to the handle to secure the slug within the interior cavity of the handle, and
 at least one external weight capable of being connected to the handle.

29. An exercise resistance system as set forth in claim 22 wherein the hand or foot engagement structure is a harness capable of being attached to a user.

30. An exercise resistance system as set forth in claim 22 wherein the hand or foot engagement structure is a strap which is connected to a handle.

31. An exercise resistance system as set forth in claim 30 wherein the handle contains two ends, the handle containing threads disposed at each end of the handle and the handle further defining a channel disposed at each end of the handle and along one side of the handle, each channel extending further from each end of the handle than the threads, whereby the strap connected to the handle and passing through a cavity within the handle may be passed through each channel in the handle.

32. An exercise resistance system as set forth in claim 22 wherein the hand or foot engagement structure is a strap, the strap having a first end and a second end, the first end being connected to a first ring, and the second end being connected to a second ring, the first and second rings being slidably connected to a handle having a first end and a second end, the first ring being connected to the first end of the handle by sliding the first ring over the first end of the handle, and the second ring being connected to the second end of the handle by sliding the second ring over the second end of the handle.

33. An exercise resistance system as set forth in claim 22 wherein the hand or foot engagement structure is a strap, the strap having a first end and a second end, the first end being connected to a first ring, and the second end being connected to a second ring, the first and second rings being connected to each other and to the elastic resistance cord by at least one finger clip, and a strap grip being slidably connected around the strap.

34. An exercise resistance system as set forth in claim 22 wherein the anchoring structure is a pad which may be free standing or capable of being placed over or under an interactive TV structure.

35. An exercise resistance system as set forth in claim 22 wherein the anchoring structure is an interactive TV structure.

36. An exercise resistance system as set forth in claim 22 wherein the hand or foot engagement structure comprises at least one handle, being comprised of at least one section, each section having a male end or a female end, and at least one bar having a male end or a female end, the bar being capable of insertion into the end section of a handle.

37. An exercise resistance system as set forth in claim 36 wherein a roller is rotably connected to the handle, the handle being passed through the roller such that the roller is capable of rotating around the handle.

38. An exercise resistance system as set forth in claim 22 wherein the hand or foot engagement structure is a barbell.

39. An exercise resistance system as set forth in claim 22 wherein the hand or foot engagement structure is a bar.

40. An exercise resistance system as set forth in claim 22 wherein the anchoring structure is an aerobic step which may be free standing or capable of being placed over or under an interactive TV structure.

41. An exercise resistance system as set forth in claim 22 wherein the hand or foot engagement structure is a glove.

42. An exercise resistance system as set forth in claim 22 wherein the anchoring structure is a pad and the pad contains a pocket whereby various items may be stored within the pocket, the pocket being permanently attached to the pad or removable.

43. An exercise resistance system comprising:
  a first elastic resistance cord and a second elastic resistance cord, each having two ends,
  a first length quick adjustment device and a second length quick adjustment device, each length quick adjustment device comprising a body defining a passageway for receiving an elastic resistance cord, an included surface within the body angularly positioned with respect to the passageway, and a ball or cylinder in contact with the inclined surface and the elastic resistance cord and capable of rolling along the inclined surface each length quick adjustment device attached to one of the elastic resistance cords, each of which is capable of securing the elastic resistance cord by passing each elastic resistance cord through the length quick adjustment device in a linear manner and pulling the elastic resistance cord in one direction and capable of releasing the elastic resistance cord by pulling the elastic resistance cord in the other direction,
  a first means of attaching the first elastic resistance cord at one end to a first anchoring structure and a second means of attaching the second elastic resistance cord at one end to a second anchoring structure, and
  a first hand or foot engagement structure connected to the first length quick adjustment device and a second hand or foot engagement structure connected to the second length quick adjustment device, in order to conduct exercises.

* * * * *